US007520439B1

(12) United States Patent
Gandel et al.

(10) Patent No.: US 7,520,439 B1
(45) **Date of Patent: *Apr. 21, 2009**

(54) PORTABLE ELECTRONIC DEVICES WITH CONVENIENT OR FOLDABLE TRANSACTION CARDS

(75) Inventors: Priscilla Gandel, Long Branch, NJ (US); Ellen Lasch, New York, NY (US); Lisa Ann Morrill Webb, Darien, CT (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/700,521

(22) Filed: Jan. 31, 2007

Related U.S. Application Data

(63) Continuation of application No. 11/284,008, filed on Nov. 21, 2005, now Pat. No. 7,278,584, which is a continuation-in-part of application No. 11/013,094, filed on Dec. 15, 2004, now Pat. No. 7,070,095, and a continuation-in-part of application No. 10/802,171, filed on Mar. 17, 2004, now Pat. No. 7,137,552, which is a continuation-in-part of application No. 10/733, 619, filed on Dec. 10, 2003, now Pat. No. 7,147,151, which is a continuation-in-part of application No. 10/436,394, filed on May 12, 2003, now Pat. No. 7,213,764, application No. 11/013,094.

(60) Provisional application No. 60/660,069, filed on Mar. 9, 2005, provisional application No. 60/442,991, filed on Jan. 28, 2003, provisional application No. 60/424, 592, filed on Nov. 7, 2002.

(51) Int. Cl.
*G06K 19/06* (2006.01)
*G06K 19/00* (2006.01)
*G06K 5/00* (2006.01)

(52) U.S. Cl. ........................ 235/492; 235/487; 235/493; 235/380

(58) Field of Classification Search ................. 235/492, 235/487, 493, 380; 283/106–108, 117; 455/558; 361/737; 705/41
See application file for complete search history.

(56) References Cited

U.S. PATENT DOCUMENTS

| | | | |
|---|---|---|---|
| 2,767,756 | A | 10/1956 | Niles |
| 3,369,585 | A | 2/1968 | Martinsen |
| 3,446,260 | A | 5/1969 | Osher |
| 3,647,165 | A | 3/1972 | Whitla |
| 3,648,832 | A | 3/1972 | Kirshenbaum et al. |

(Continued)

FOREIGN PATENT DOCUMENTS

| | | |
|---|---|---|
| CA | 2300241 | 9/2000 |

(Continued)

*Primary Examiner*—Daniel Walsh
(74) *Attorney, Agent, or Firm*—Snell & Wilmer L.L.P.

(57) ABSTRACT

Convenient transaction cards are provided that may be attached or interconnected with portable electronic devices, such as, for example, cellular telephones, PDAs, MP3 players, the iPod™ digital music device, and other like portable electronic music devices. The transaction cards may be foldable to provide for convenient storage and access of the transaction card when utilized. In addition, the transaction cards may be provided within a case or a housing that may be removable from the electronic device.

23 Claims, 27 Drawing Sheets

U.S. PATENT DOCUMENTS

| | | | | | |
|---|---|---|---|---|---|
| 3,929,177 | A | | 12/1975 | Reis | |
| 3,940,016 | A | | 2/1976 | Krakauer | |
| 4,056,139 | A | * | 11/1977 | Murt | 150/137 |
| 4,105,057 | A | | 8/1978 | Baumann et al. | |
| 4,356,646 | A | * | 11/1982 | Johnson, Jr. | 40/651 |
| D270,303 | S | | 8/1983 | Zautner | |
| 4,562,342 | A | * | 12/1985 | Solo | 235/380 |
| 4,581,523 | A | | 4/1986 | Okuno | |
| 4,697,363 | A | | 10/1987 | Gamm | |
| 4,717,908 | A | * | 1/1988 | Phillips et al. | 340/568.7 |
| 4,768,811 | A | | 9/1988 | Oshikoshi et al. | |
| 4,801,790 | A | | 1/1989 | Solo | |
| 4,849,617 | A | * | 7/1989 | Ueda | 235/492 |
| 4,851,610 | A | * | 7/1989 | LeBlanc et al. | 174/353 |
| 4,884,507 | A | * | 12/1989 | Levy | 102/293 |
| 4,897,533 | A | | 1/1990 | Lyszczarz | |
| 4,897,947 | A | | 2/1990 | Kass-Pious | |
| 4,917,292 | A | | 4/1990 | Drexler | |
| D307,979 | S | | 5/1990 | Purvis | |
| 4,930,234 | A | * | 6/1990 | Schmidt | 40/1.5 |
| 4,937,963 | A | | 7/1990 | Barnes | |
| 4,957,311 | A | | 9/1990 | Geisenheimer | |
| 5,004,899 | A | * | 4/1991 | Ueda | 235/492 |
| 5,007,899 | A | | 4/1991 | Larsson | |
| 5,015,830 | A | | 5/1991 | Masuzawa et al. | |
| 5,065,004 | A | * | 11/1991 | Mizuno et al. | 235/479 |
| 5,171,039 | A | | 12/1992 | Dusek | |
| 5,189,894 | A | | 3/1993 | Buck | |
| 5,215,334 | A | * | 6/1993 | Presson et al. | 283/76 |
| 5,257,656 | A | | 11/1993 | McLeroy | |
| 5,279,019 | A | | 1/1994 | Knickle | |
| 5,308,121 | A | * | 5/1994 | Gunn | 283/99 |
| 5,311,679 | A | | 5/1994 | Birch, Sr. | |
| 5,461,219 | A | | 10/1995 | Cronvall et al. | |
| 5,478,629 | A | | 12/1995 | Norman | |
| 5,503,434 | A | | 4/1996 | Gunn et al. | |
| 5,506,395 | A | | 4/1996 | Eppley | |
| 5,520,230 | A | | 5/1996 | Sumner, III | |
| 5,541,985 | A | * | 7/1996 | Ishii et al. | 379/111 |
| 5,575,094 | A | | 11/1996 | Leake et al. | |
| 5,577,609 | A | | 11/1996 | Hexter | |
| 5,615,250 | A | * | 3/1997 | Kobayashi | 455/558 |
| 5,653,336 | A | * | 8/1997 | Buonaiuto et al. | 206/320 |
| 5,658,157 | A | * | 8/1997 | Koiwa et al. | 439/165 |
| 5,665,439 | A | | 9/1997 | Anderson et al. | |
| 5,700,037 | A | * | 12/1997 | Keller | 283/107 |
| 5,710,421 | A | * | 1/1998 | Kokubu | 235/492 |
| 5,725,098 | A | * | 3/1998 | Seifert et al. | 206/472 |
| 5,823,359 | A | | 10/1998 | Harris et al. | |
| 5,865,470 | A | * | 2/1999 | Thompson | 283/70 |
| 5,886,333 | A | | 3/1999 | Miyake | |
| 5,894,597 | A | * | 4/1999 | Schwartz et al. | 455/558 |
| 5,912,446 | A | | 6/1999 | Wong et al. | |
| 5,915,016 | A | * | 6/1999 | Savalle et al. | 379/433.09 |
| 5,924,624 | A | | 7/1999 | Martin | |
| 5,933,328 | A | * | 8/1999 | Wallace et al. | 361/737 |
| 5,938,010 | A | | 8/1999 | Osterbye | |
| 5,968,570 | A | | 10/1999 | Paulucci | |
| 5,973,475 | A | * | 10/1999 | Combaluzier | 320/107 |
| 5,979,942 | A | | 11/1999 | Ivicic | |
| 6,025,283 | A | | 2/2000 | Roberts | |
| 6,027,028 | A | | 2/2000 | Pieterse et al. | |
| 6,032,866 | A | | 3/2000 | Knighton et al. | |
| 6,082,422 | A | | 7/2000 | Kaminski | |
| D432,939 | S | | 10/2000 | Hooglander | |
| 6,128,604 | A | | 10/2000 | Sakamaki et al. | |
| 6,148,484 | A | | 11/2000 | Andreae, Jr. | |
| 6,171,138 | B1 | | 1/2001 | Lefebvre et al. | |
| 6,184,788 | B1 | * | 2/2001 | Middlemiss et al. | 340/568.7 |
| 6,190,747 | B1 | * | 2/2001 | Fischer | 428/42.2 |
| 6,223,977 | B1 | | 5/2001 | Hill | |
| 6,227,424 | B1 | | 5/2001 | Roegner | |
| 6,330,961 | B1 | * | 12/2001 | Borja | 224/222 |
| 6,375,081 | B1 | * | 4/2002 | Hileman et al. | 235/487 |
| 6,415,138 | B2 | * | 7/2002 | Sirola et al. | 455/90.1 |
| 6,419,158 | B2 | | 7/2002 | Hooglander | |
| 6,421,245 | B1 | * | 7/2002 | Kashima | 361/737 |
| 6,435,236 | B2 | * | 8/2002 | Gribovsky | 150/137 |
| 6,460,696 | B1 | | 10/2002 | Meyer | |
| 6,471,127 | B2 | | 10/2002 | Pentz et al. | |
| 6,481,623 | B1 | | 11/2002 | Grant et al. | |
| 6,497,368 | B1 | * | 12/2002 | Friend et al. | 235/472.01 |
| 6,523,292 | B2 | | 2/2003 | Slavik | |
| D474,234 | S | | 5/2003 | Nelms et al. | |
| 6,601,622 | B1 | | 8/2003 | Young | |
| 6,644,551 | B2 | | 11/2003 | Clayman et al. | |
| 6,651,813 | B2 | | 11/2003 | Vallans et al. | |
| 6,681,926 | B2 | | 1/2004 | DeVolpi | |
| 6,735,081 | B1 | | 5/2004 | Bishop et al. | |
| 6,751,805 | B1 | | 6/2004 | Austion | |
| 6,752,272 | B2 | | 6/2004 | Jones et al. | |
| 6,764,014 | B2 | | 7/2004 | Lasch et al. | |
| 6,766,952 | B2 | * | 7/2004 | Luu | 235/451 |
| 6,788,919 | B2 | * | 9/2004 | Watanabe | 455/90.3 |
| 6,823,910 | B1 | | 11/2004 | Elnekaveh | |
| 6,824,066 | B2 | | 11/2004 | Weyant | |
| 6,839,432 | B1 | * | 1/2005 | Martin | 379/446 |
| 6,843,422 | B2 | | 1/2005 | Jones et al. | |
| 6,845,863 | B1 | | 1/2005 | Riley | |
| 6,866,439 | B2 | | 3/2005 | Steinschaden | |
| 6,871,682 | B2 | | 3/2005 | Hogganvik | |
| 6,892,875 | B2 | | 5/2005 | DeVolpi | |
| 6,910,624 | B1 | * | 6/2005 | Natsuno | 235/379 |
| 6,978,940 | B2 | | 12/2005 | Luu | |
| 7,023,692 | B2 | * | 4/2006 | Mansutti et al. | 361/683 |
| 7,048,216 | B2 | | 5/2006 | Hodson et al. | |
| 7,055,740 | B1 | | 6/2006 | Schultz et al. | |
| 7,059,520 | B1 | * | 6/2006 | Shtesl | 235/449 |
| 7,070,095 | B1 | * | 7/2006 | Gandel et al. | 235/380 |
| 7,079,875 | B2 | * | 7/2006 | Robertson, Jr. | 455/575.1 |
| D526,779 | S | * | 8/2006 | Gandel et al. | D3/247 |
| 7,100,829 | B2 | * | 9/2006 | Okada | 235/439 |
| 7,124,955 | B2 | * | 10/2006 | Lasch et al. | 235/487 |
| 7,130,648 | B1 | * | 10/2006 | Fournier et al. | 455/466 |
| 7,137,552 | B1 | * | 11/2006 | Lasch et al. | 235/380 |
| 7,147,151 | B2 | * | 12/2006 | Lasch et al. | 235/380 |
| 7,156,301 | B1 | * | 1/2007 | Bonalle et al. | 235/380 |
| 7,213,764 | B2 | * | 5/2007 | Lasch et al. | 235/486 |
| 7,249,715 | B1 | * | 7/2007 | Lambright | 235/487 |
| 7,270,255 | B2 | * | 9/2007 | Badillo et al. | 224/577 |
| 7,278,584 | B1 | * | 10/2007 | Gandel et al. | 235/492 |
| 7,290,364 | B2 | | 11/2007 | Nelms et al. | |
| 7,310,692 | B2 | * | 12/2007 | Miller et al. | 710/11 |
| 7,336,973 | B2 | | 2/2008 | Goldthwaite et al. | |
| 7,347,360 | B2 | * | 3/2008 | Lasch et al. | 235/380 |
| 2001/0003498 | A1 | * | 6/2001 | Uwabo et al. | 360/97.01 |
| 2001/0012637 | A1 | * | 8/2001 | Casterlin et al. | 436/518 |
| 2001/0021657 | A1 | * | 9/2001 | Morita | 455/550 |
| 2002/0040935 | A1 | * | 4/2002 | Weyant | 235/487 |
| 2002/0074246 | A1 | * | 6/2002 | Tiscione et al. | 206/39.4 |
| 2002/0086704 | A1 | * | 7/2002 | Meindl et al. | 455/558 |
| 2002/0104811 | A1 | | 8/2002 | Young et al. | |
| 2002/0114130 | A1 | * | 8/2002 | Schremmer et al. | 361/683 |
| 2002/0125164 | A1 | | 9/2002 | Bassinson | |
| 2002/0153410 | A1 | | 10/2002 | Santini | |
| 2002/0166897 | A1 | * | 11/2002 | Hooglander | 235/492 |
| 2002/0177407 | A1 | * | 11/2002 | Mitsumoto | 455/41 |
| 2003/0085285 | A1 | * | 5/2003 | Luu | 235/486 |
| 2003/0085288 | A1 | * | 5/2003 | Luu | 235/492 |
| 2003/0132132 | A1 | | 7/2003 | Small | |
| 2003/0153356 | A1 | * | 8/2003 | Liu | 455/558 |
| 2003/0213849 | A1 | * | 11/2003 | Luu | 235/492 |
| 2003/0222153 | A1 | | 12/2003 | Pentz et al. | |
| 2004/0087339 | A1 | * | 5/2004 | Goldthwaite et al. | 455/558 |

2004/0089724 A1* 5/2004 Lasch et al. ................ 235/487
2004/0093689 A1 5/2004 Sosa et al.
2004/0104268 A1 6/2004 Bailey et al.
2004/0108032 A1 6/2004 Lyons
2004/0126284 A1* 7/2004 Lilly et al. .................. 422/119
2004/0127256 A1* 7/2004 Goldthwaite et al. ........ 455/558
2004/0129785 A1* 7/2004 Luu ........................... 235/486
2004/0144846 A1* 7/2004 Lasch et al. ................ 235/487
2004/0169087 A1* 9/2004 Lasch et al. ................ 235/493
2004/0169088 A1* 9/2004 Nelms et al. ................ 235/493
2004/0256455 A1* 12/2004 Fukushima et al. ......... 235/382
2005/0001041 A1* 1/2005 McCarthy et al. ........... 235/492
2005/0011776 A1 1/2005 Nagel
2005/0025117 A1* 2/2005 Inagaki et al. ............... 370/350
2005/0033994 A1* 2/2005 Suzuki ....................... 713/202
2005/0136996 A1* 6/2005 Robertson, Jr. .......... 455/575.1
2005/0184166 A1 8/2005 Pentz et al.
2005/0197169 A1* 9/2005 Son ........................... 455/572
2005/0205665 A1* 9/2005 Lasch et al. ................ 235/380
2005/0247798 A1* 11/2005 Graves et al. ............... 235/493
2006/0105821 A1* 5/2006 Goradesky et al. ....... 455/575.1
2006/0175416 A1* 8/2006 Ho ............................ 235/492
2006/0192723 A1* 8/2006 Harada et al. ............... 343/866
2006/0206582 A1* 9/2006 Finn ........................... 709/217
2006/0208066 A1* 9/2006 Finn et al. ................... 235/380
2006/0226217 A1* 10/2006 Narendra et al. ............ 235/380
2006/0234778 A1* 10/2006 Matsushita et al. .......... 455/565
2006/0278723 A1* 12/2006 Dan et al. ................... 235/492
2007/0057004 A1* 3/2007 Butler et al. ................ 224/669
2007/0068978 A1 3/2007 Jackson et al.
2007/0069034 A1* 3/2007 Lasch et al. ................ 235/487
2007/0096924 A1* 5/2007 Horne ..................... 340/572.8
2007/0099511 A1* 5/2007 Miller et al. ................ 439/630
2007/0108279 A1* 5/2007 Wang ......................... 235/441
2007/0123190 A1* 5/2007 Enmei ........................ 455/344
2007/0152066 A1* 7/2007 Colby et al. ................ 235/487
2007/0158435 A1* 7/2007 Lasch et al. ................ 235/487
2007/0232371 A1* 10/2007 Soekawa et al. ......... 455/575.5
2007/0275759 A1* 11/2007 Kemppinen ................. 455/558
2008/0093467 A1* 4/2008 Narendra et al. ............ 235/492

FOREIGN PATENT DOCUMENTS

DE 19741726 9/1997
EP 0735505 10/1996
GB 2281714 3/1995
WO WO0073989 12/2000
WO WO0113320 2/2001
WO WO02067190 8/2002
WO WO2004052657 6/2004

* cited by examiner

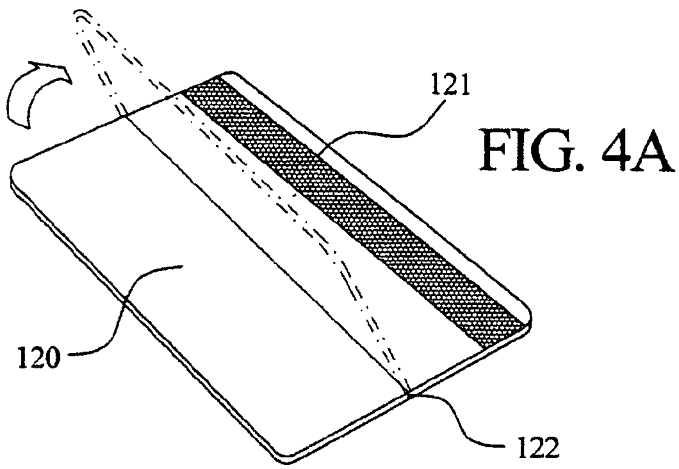
FIG. 4A
FIG. 4B
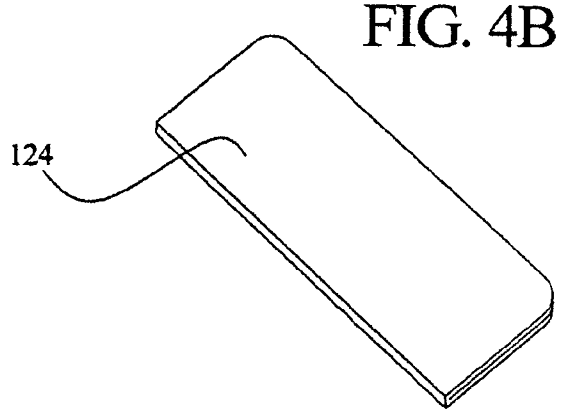
FIG. 5A
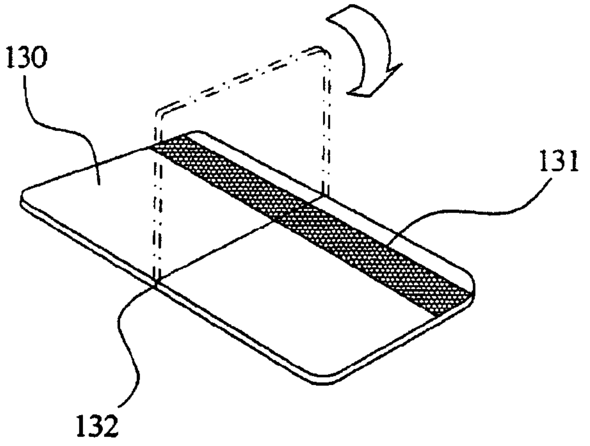
FIG. 5B
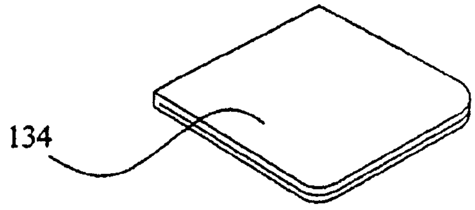

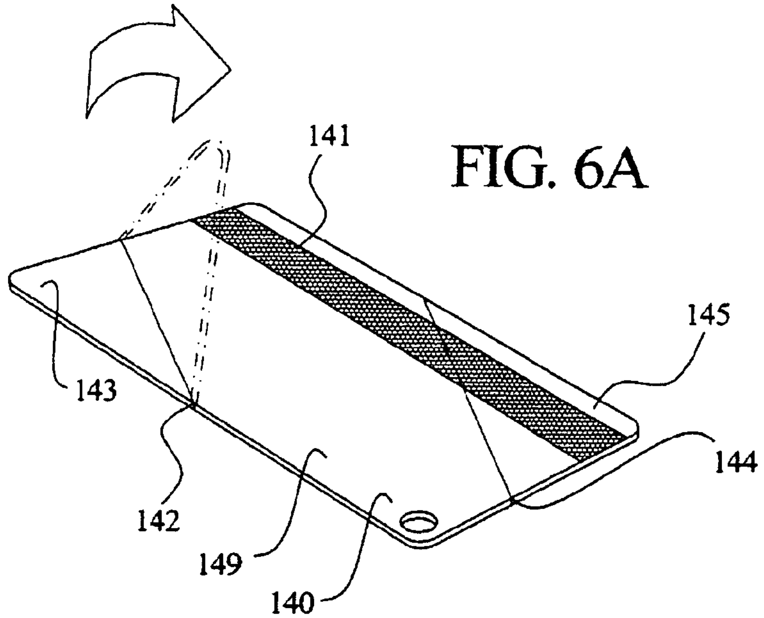
FIG. 6A
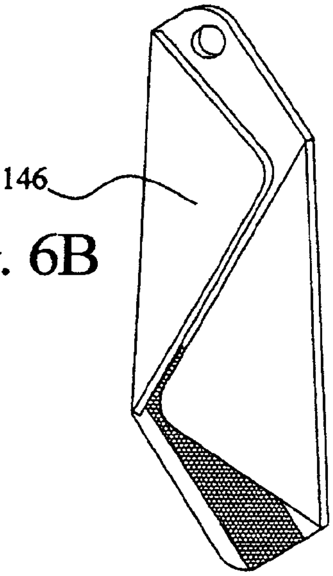
FIG. 6B
FIG. 6C
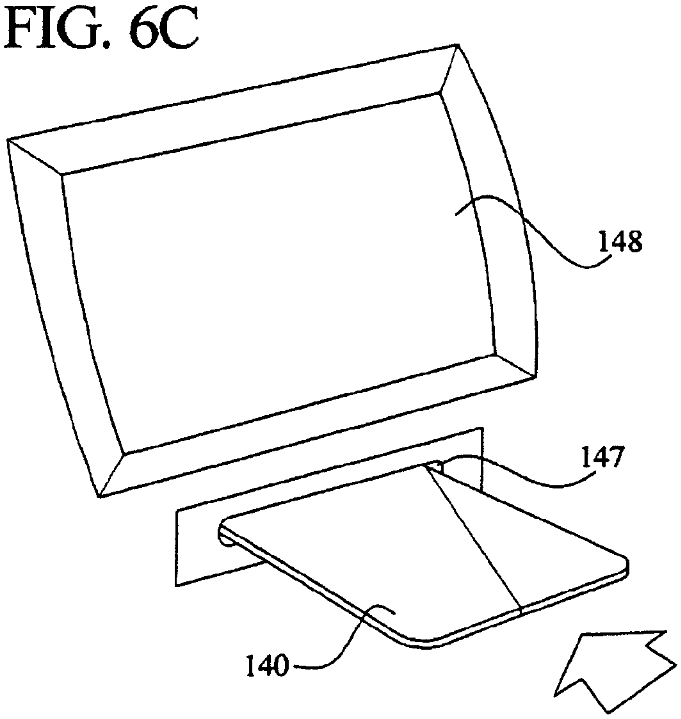

FIG. 16A
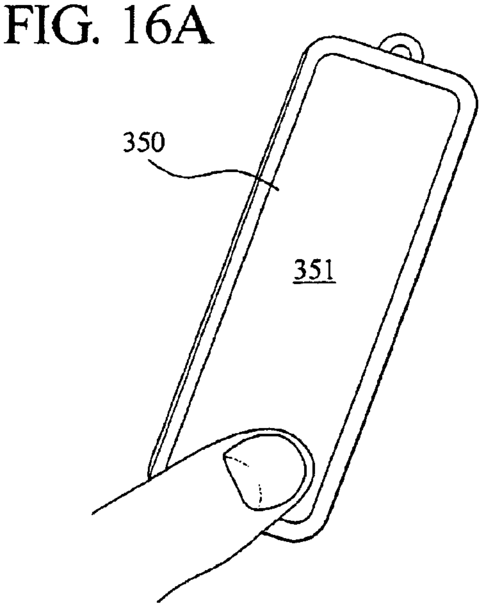
FIG. 16B
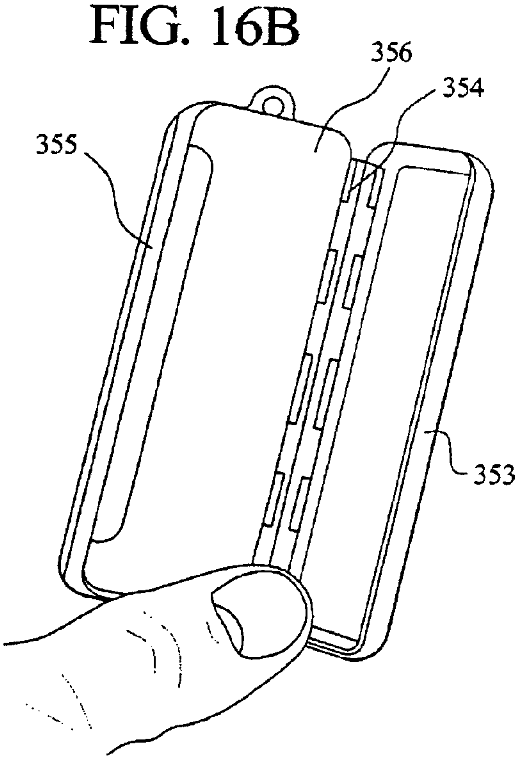
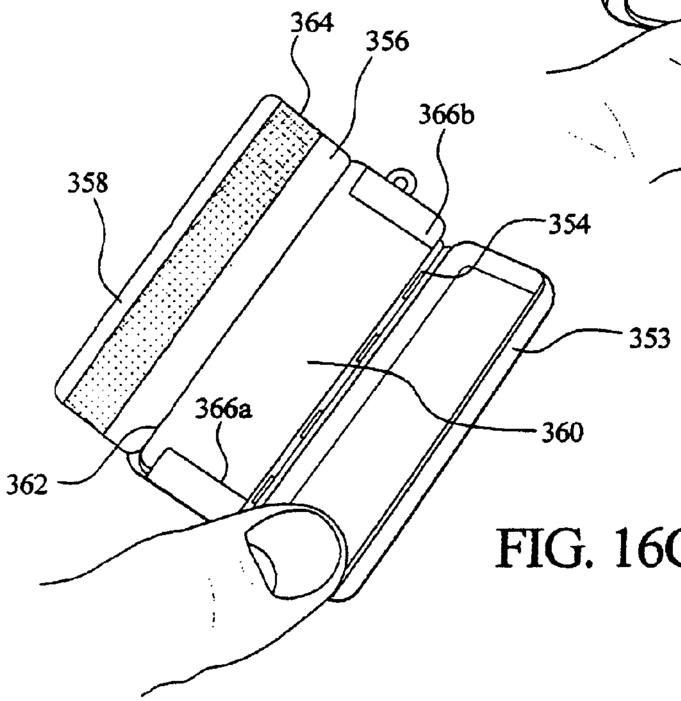
FIG. 16C

PORTABLE ELECTRONIC DEVICES WITH CONVENIENT OR FOLDABLE TRANSACTION CARDS

The present invention claims priority to U.S. Provisional Patent Application No. 60/660,069, filed Mar. 9, 2005. In addition, the present invention is a Continuation of U.S. patent application Ser. No. 11/284,008, filed Nov. 21, 2005 now U.S. Pat. No. 7,278,584, which is a Continuation-in-Part of U.S. patent application Ser. No. 11/013,094, filed Dec. 15, 2004 (now U.S. Pat. No. 7,070,095), and a Continuation-in-Part of U.S. patent application Ser. No. 10/802,171, filed Mar. 17, 2004, now U.S. Pat. No. 7,137,552, each of which is a Continuation-in-Part of U.S. patent Ser. No. 10/733,619, filed Dec. 10, 2003 (now U.S. Pat. No. 7,147,151), which is a Continuation-in-Part of U.S. patent application Ser. No. 10/436,394, filed on May 12, 2003 now U.S. Pat. No. 7,213,764, which claimed priority to U.S. Provisional Patent Application No. 60/442,991, filed on Jan. 28, 2003 and U.S. Provisional Patent Application No. 60/424,592, filed on Nov. 7, 2002, each of which is expressly incorporated herein in its entirety.

FIELD OF THE INVENTION

Convenient transaction cards are provided that may be attached to, connected to or otherwise disposed with portable electronic devices, such as, for example, cellular telephones, MP3 players, the iPod™ digital music player from Apple Computer, Inc., or other like portable electronic devices. The transaction cards may be foldable to provide for convenient storage and access of the transaction card when utilized. In addition, the transaction cards may be provided within a case or a housing that may be removable from the electronic music device.

BACKGROUND

It is generally known to provide transaction cards for providing a means for purchasing goods or services without the use of paper money or coinage. Specifically, transaction cards may represent credit, whereby a user of the transaction card may present the card in lieu of the paper money or coinage. Alternatively, transaction cards may be debit cards, whereby electronic money, such as money stored in an account, is removed from the account each time that the transaction card is used. In addition, transaction cards may have a certain amount of money, or other valuable commodity, recorded thereon, whereby a user of the transaction card may remove the money directly from the transaction card. For example, retail stores now offer cards that can be purchased for a certain amount of money. That amount, or any other amount, may be represented on the transaction card. When the transaction card is utilized, the amount represented on the card may be reduced until the transaction card represents that it cannot be utilized anymore, or that the card represents that it is not worth any more money. In addition, other values besides currency may be represented on the transaction card, such as equivalent goods or services.

Transaction cards typically have a magnetic stripe provided, or some other means, for storing information relating to the transaction card, such as, a security code, and information relating to an account or an amount of money that the transaction card may represent. For example, if the transaction card is a credit card, the information contained on the magnetic stripe may relate to an account whereby use of the credit card may alert the account to release funds for the purchase of goods or services. Of course, the magnetic stripe or other means may further contain any other information to allow the transaction card to be utilized. The transaction card is typically fed into or through a reader that reads the information contained on the magnetic stripe to extract the information as needed when the transaction card is being used.

The transaction card may further contain other features that allow for the secure and efficient use of the transaction card, such as holographic security devices, signature panels, pictures of the owner of the transaction card, embedded microchips, or any other item or element that may be useful for the transaction card.

Transaction cards are typically sized according to standards set by the International Organization for Standardization (ISO). This means that most traditional transaction cards being utilized are of the same size and dimensions, typically about 2¼ inches by about 3⅜ inches in a generally rectangular configuration. However, a transaction card having dimensions according to this standard typically is too big to be stored in a convenient way except loose in a pocket, wallet or purse, or contained within a slot in a wallet or purse allowing the snug fit of the transaction card. Transaction cards are, therefore, highly susceptible to being lost or stolen. Other shapes and sizes would allow the transaction cards to be attached to, secured with, or otherwise stored with other items, such as key chains, for example.

Moreover, portable electronic devices, such as cellular telephones, portable music devices, including MP3 players, the iPod™ electronic music player from Apple Computer, Inc., or other like devices, are more often being carried by individuals, along with wallets, to hold transaction cards.

A need exists, therefore, for a transaction card having the capability of being attached to securing means or stored in smaller areas than are currently allowed. For example, a need exists for a transaction card that may be clipped or otherwise attached to a keychain, or some other means for securing the transaction card to another item, such as a portable electronic music device, yet is small enough to remain inconspicuous and compact, but handy. Further, a need exists for a transaction card having the above-noted advantages and further that maintains the information or other features typically disposed on or within a transaction card. Still further, a need exists for a case or housing for holding and/or storing the foldable transaction card contained therein.

More specifically, a need exists for a transaction card having the capability of being attached, disposed within, or otherwise interconnected with a portable electronic device, such as a portable electronic device, such as a cellular telephone, a personal digital assistant ("PDA"), an MP3 player, an iPod™ digital music player, or other like portable electronic music player.

SUMMARY

Convenient transaction cards are provided that may be attached or connected to electronic devices, such as, for example, cellular telephones, PDAs, portable MP3 players, the iPod™ digital music player from Apple Computer, Inc., or other like devices. The transaction cards may be foldable to provide for convenient storage and access of the transaction card when utilized. In addition, the transaction cards may be provided within a case or a housing that may be removable from the portable electronic music device.

It is, therefore, an advantage to provide a transaction card that is foldable so as to be highly compact so that the transaction card may be stored in small areas. Further, it is an advantage of the present invention to provide a transaction card that may be attached to another item via a securing means, such as a ring or chain. Moreover, it is an advantage to provide a foldable transaction card that may be contained within a housing or case.

It is particularly an advantage to provide a transaction card that can be attached to a portable electronic device, such as, for example, a cellular telephone, a PDA, an MP3 player, an iPod™ digital music player from Apple Computer, Inc., or other like portable electronic device. Therefore, an advantage of the present invention is that the transaction card may be small enough to be inconspicuous and be secured to a portable electronic device thereby minimizing the chance that the transaction card will be misplaced, lost or stolen.

It is a further advantage to provide a transaction card that is foldable and held and/or stored within a case or housing that comprises other features typically found on or within a transaction card, such as security devices, embedded microchips, or magnetic stripes having information stored thereon or the like.

Additional features and advantages of the presently preferred examples are described in, and will be apparent from, the detailed description of the presently preferred embodiments and from the drawings.

BRIEF DESCRIPTION OF THE DRAWINGS

FIGS. 4A and 4B illustrate a transaction card foldable longitudinally and parallel to the long edges of the transaction card.

FIGS. 5A and 5B illustrate a smaller-sized transaction card that is transversely foldable.

FIGS. 6A-6C illustrate a transaction card having fold lines disposed at angles to the edges of the transaction card but can be unfolded to be utilized within a point-of-sale machine.

FIGS. 16A to 16C illustrate an alternate embodiment of a foldable transaction card system.

DETAILED DESCRIPTION

Convenient transaction cards are provided that may be attached or connected to electronic devices, such as, for example, cellular telephones, PDAs, MP3 players, the iPod™ digital music player from Apple Computer, Inc., or other like portable electronic devices. The transaction cards may be foldable to provide for convenient storage and access of the transaction card when utilized. In addition, the transaction cards may be provided within a case or a housing that may be removable from the electronic device.

Figure 1A:
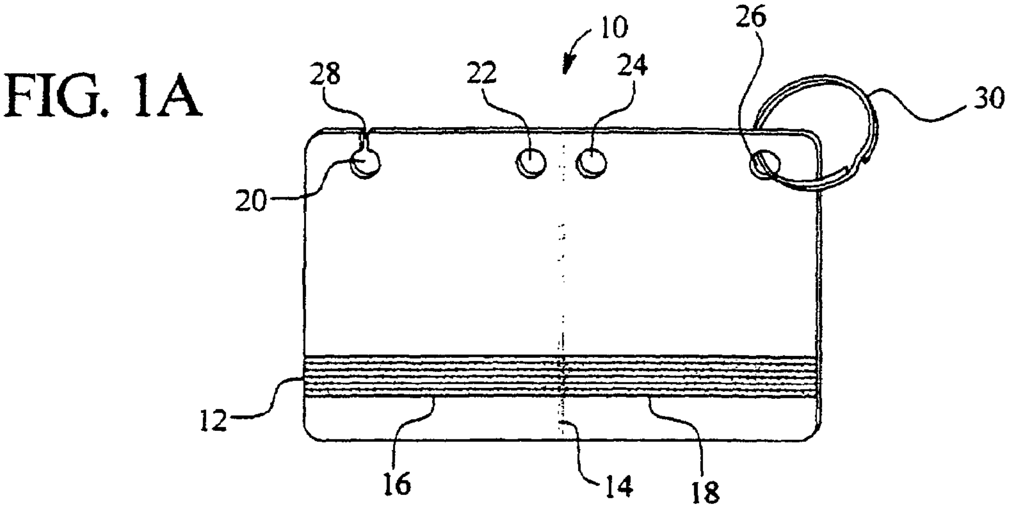
FIGS. 1A-1C illustrate a transaction card that is transversely foldable and having apertures for securing a ring or a keychain thereto.
Figure 1B:
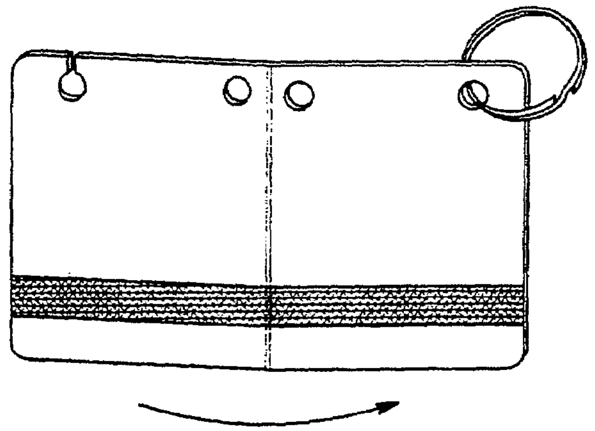
Figure 1C:
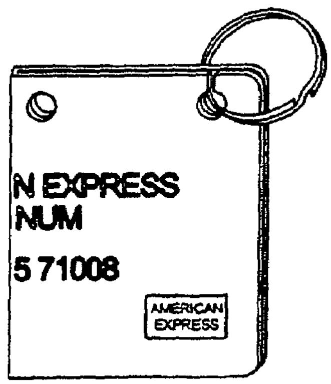

Referring now to FIGS. 1A-1C, a first example of the present invention is illustrated. FIGS. 1A-1C illustrates a foldable transaction card 10, shown generically as merely having a magnetic stripe 12. Other features not shown, however, may be provided on the transaction card, such as a signature panel, an embedded microchip, a holographic image, or the like. These features may allow the transaction card to function more easily, efficiently, and/or more securely.

Of course, the transaction card 10 typically comprises a plurality of layers (not shown) to form the rigid card. For example, transaction cards typically include inner layers of a polymeric material to provide the transaction card with thickness and bulk. In addition, outer layers are typically provided comprising a polymeric material that protects the inner layers of the transaction card. In addition, the polymeric material of the outer layers may provide rigidity and further may add to the thickness of the transaction card. The transaction card 10, and the other transaction cards described herein, may be made from any generally known material typically used for transaction cards, such as, for example, polyvinylchloride (PVC) and polypropylene (PP). Typically, transaction cards such as the ones described herein have multiple layers of polymeric materials. For example, a typical card may have one or more internal layers of PVC or PP, and outer layers of polyethylene terephthalate (PET) for rigidity and strength.

Transaction cards may further be transparent, as described in U.S. patent application Ser. No. 10/092,681, filed Mar. 7, 2002, which is a continuation-in-part application of U.S. patent application Ser. No. 10/062,106, filed Jan. 31, 2001, which is a continuation-in-part application of U.S. patent application Ser. No. 09/653,837, filed Sep. 1, 2000 and further claims the benefit of U.S. Provisional Application No. 60/153,112, filed Sep. 7, 1999; U.S. Provisional Application No. 60/160,519, filed Oct. 20, 1999; U.S. Provisional Application No. 60/167,405, filed Nov. 24, 1999; U.S. Provisional Patent Application No. 60/171,689, filed Dec. 21, 1999, each of which is expressly incorporated herein in its entirety. The transparent transaction card may contain a plurality of optically recognizable layers or an infrared-blocking ink to allow the transparent transaction cards to be recognized by a card reader.

The transaction card 10 has a fold line 14 that allows the transaction card 10 to be folded, as illustrated in FIGS. 1B and 1C. The fold line may be made by scoring the outer layers of the transaction card 10 via a scoring means, such as a blade or a laser beam and allowing the inner layers to act as a hinge when the transaction card is folded. Alternatively, the transaction card may include a reinforcing material at the location of the fold line 14 so that the fold line 14 does not pull apart, or otherwise destroy the transaction card 10 when folded. Of course, other materials may be utilized in the transaction card 10 to act as a hinge at the fold line 14, and the invention should not be limited in this regard. Moreover, the fold line 14 may comprise a break between the two halves of the transaction card 10 whereby a strip may be disposed on one or both sides of the transaction card 10 for holding the two halves together to form a hinge. The strip may be a fabric or a thermoplastic material, such as an elastomeric material that may be stretched when the transaction card is folded, yet retain its shape when the transaction card 10 is unfolded.

The magnetic stripe 12 may contain a material for storing information that may be read by a magnetic reader. Typically, the magnetic stripe 12 contains a series of digits that the magnetic card reader can utilize to obtain information about the account that the transaction card is associated with, or otherwise to obtain information relating to the amount of money or other equivalent good or service represented by the transaction card 10. The magnetic stripe 12 of the present embodiment is, necessarily, split into two halves because of the fold line 14 that bisects the magnetic stripe 12. Therefore, the information contained on the magnetic stripe 12 must be readable by a magnetic card reader at a point-of-sale machine that accounts for the fold line 14. Typically, this means that some or all of the information should be contained on a first section 16 of the magnetic stripe 12, and the rest or a duplicate of the information should be contained on a second section 18 of the magnetic stripe 12. Therefore, the information contained on the magnetic stripe 12 may be readable by the magnetic stripe reader. Alternatively, the magnetic stripe may be provided in parallel with one of the short ends of the transaction card, as illustrated in FIGS. 2A-2C, below.

Disposed in the transaction card 10 may be a plurality of apertures 20, 22, 24 and 26 that may be utilized to attach the transaction card 10 to a securing means, such as a ring 28, as illustrated in FIGS. 1A-1C. Of course, any other securing means, such as a chain or string, for example, may be utilized and the invention should not be limited as herein described. The securing means can be provided in any of the apertures as needed. Aperture 20 may include a channel 28 that allows a securing means to be slipped into the aperture 20. For example, as illustrated in FIG. 1C, the ring 28 may be provided within the aperture 26, but may also fit within the aperture 20 through the channel 28 so that the transaction card may stay folded. Alternatively, the ring 28 may be provided through one or both of the apertures 22, 24. If the ring 28 is provided through both of the apertures 22 and 24, the ring 28 may be configured in such a way as to allow the transaction card 10 to be unfolded when used.

Figure 2A:
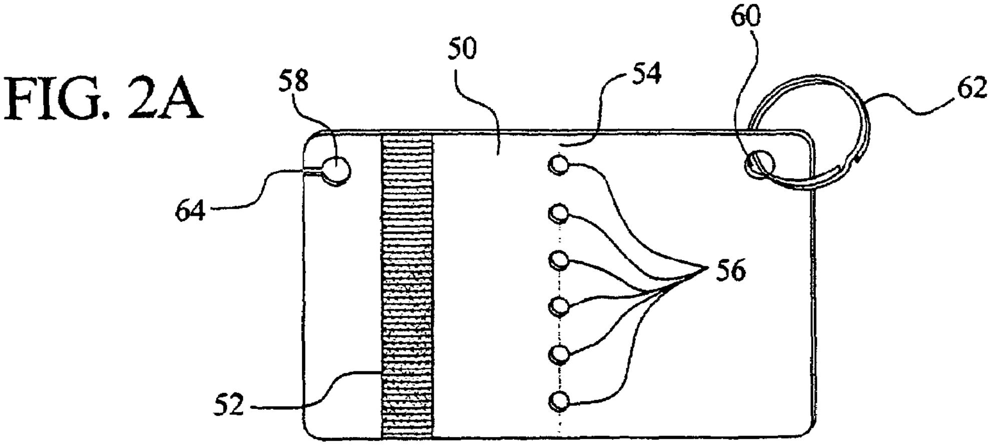
FIGS. 2A-2C illustrate another transaction card that is transversely foldable.
Figure 2B:
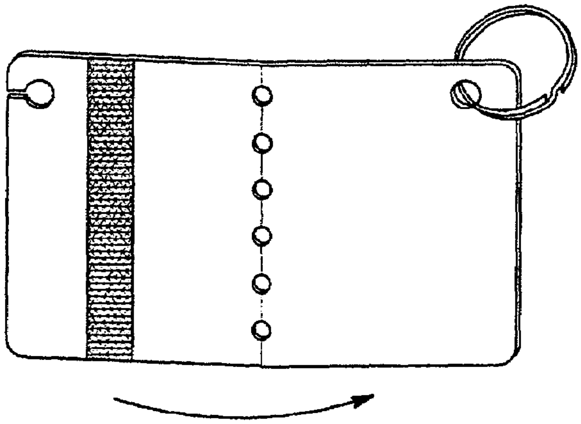
Figure 2C:
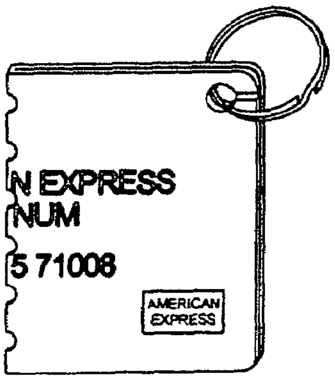

FIGS. 2A-2C illustrate an alternate example of the present invention of a foldable transaction card 50 having a magnetic stripe 52 that is parallel to a short side of the transaction card 50. The transaction card 50 may be very similar to the transaction card 10, as described above and may have a fold line 54 that divides the transaction card into two halves. Of course, more than one fold line may be provided in the transaction card 50 for dividing the card into more than just two halves, as described below. The transaction card may further have a plurality of holes 56 provided along the fold line 54 thereby giving the transaction card 50 a distinctive appearance, and further aiding in allowing the transaction card 50 to be folded along the fold line 54.

The transaction card 50 may further have apertures 58, 60 for a securing means, such as a ring 62, or other securing means such as a chain or a string, for example. The ring 62 may be provided through the aperture 60, and may further be clipped into the aperture 58 after the transaction card 50 has been folded, as illustrated in FIG. 2C. To allow the ring 62 to be clipped into the aperture 58, the aperture 58 may include a channel 64.

Figure 3A:
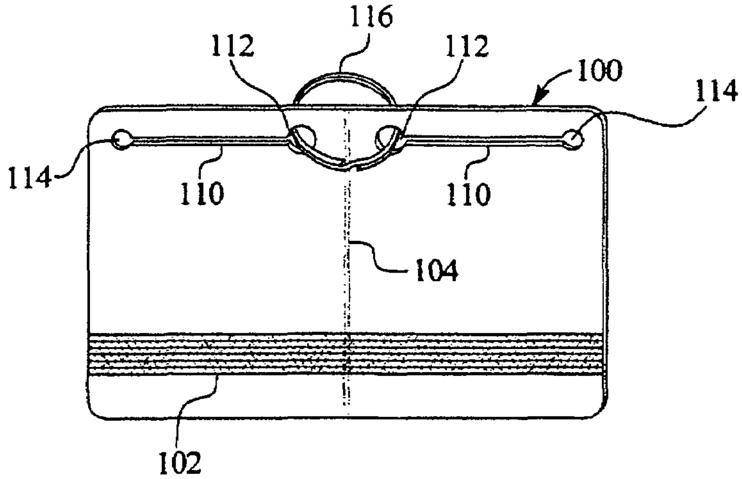
FIGS. 3A-3D illustrate another transaction card that is transversely foldable having an aperture and slot for a ring or keychain.
Figure 3B:
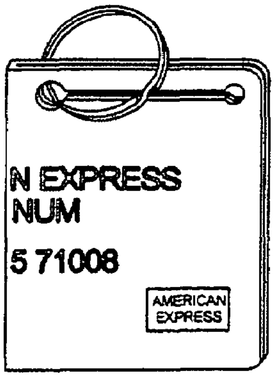
Figure 3C:
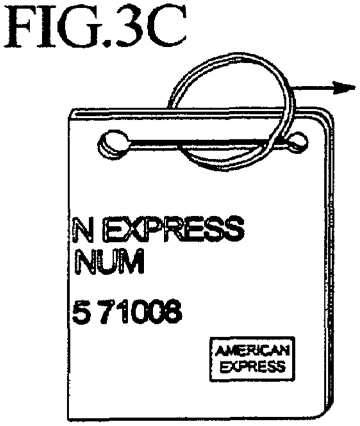
Figure 3D:
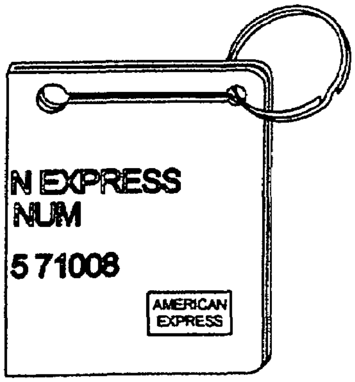

FIGS. 3A-3D illustrate a still further example of the present invention of a transaction card 100 having similar features to the transaction card 10 of FIGS. 1A-1C. For example, the transaction card 100 includes a magnetic stripe 102 and a fold line 104 allowing the transaction card 100 to be folded, thereby making the transaction card smaller and more compact. Each half of the transaction card 100 may include a slit 110 connecting two apertures 112 and 114. A ring 116, or other securing means, may be provided through the apertures 112 such that, when folded, as illustrated in FIGS. 3B-3D, the ring 116 may translate through the slits 110 to rest in the aperture 114, thereby keeping the two halves of the transaction card 100 together when folded. If the transaction card 100 is to be opened, the ring 116 is merely translated back to the apertures 112 and the transaction card 100 is unfolded.

FIGS. 4A-4B illustrate another example of a transaction card 120 having a magnetic stripe 121 and a fold line 122 disposed longitudinally through the center of the transaction card 120 such that when the transaction card 120 is folded along said fold line 122, a folded transaction card 124 is created, as shown in FIG. 4B, which thereby protects the magnetic stripe 121. It should be noted that a smaller-sized transaction card may be created even if the fold line is not disposed longitudinally through the center of the transaction card 120.

FIGS. 5A-5B illustrate another example of a miniature transaction card 130 having a magnetic stripe 131 and a fold line 132 disposed transversely through the center of the card 130 such that when the miniature transaction card 130 is folded along said fold line 132, a folded miniature transaction card 134 is created, as illustrated in FIG. 5B. The size of the miniature transaction card 130 may be smaller than a normally-sized transaction card. Smaller-sized transaction cards are generally described below with reference to FIGS. 21-28. It should be noted that a smaller-sized transaction card may be created even if the fold line is not disposed transversely through the center of the transaction card 130.

FIGS. 6A-6C illustrate another example of a foldable transaction card 140 having a magnetic stripe 141 and two fold lines 142, 144 disposed parallel to each other but diagonal relative to the edges of the transaction card 140. The fold lines 142, 144 allow the transaction card 140 to be folded such that flaps 143, 145 fold over section 149 to form a folded transaction card 146, as illustrated in FIG. 6B, which substantially protects the magnetic stripe 141. When unfolded, the transaction card 140 may be inserted into a slot 147 of an automatic teller machine (ATM) without difficulty, as illustrated in FIG. 6C.

Figure 7A:
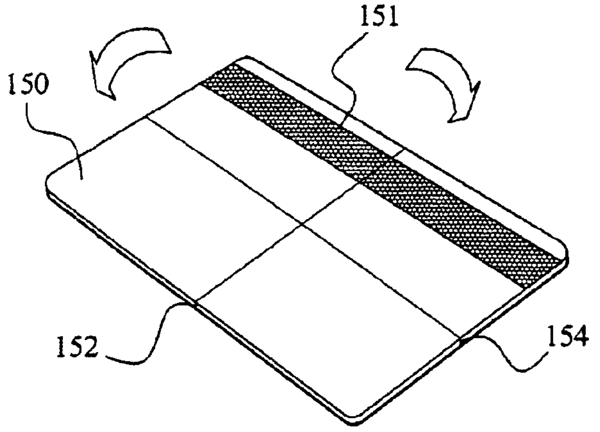
FIGS. 7A and 7B illustrate a transaction card foldable once in a longitudinal direction, and once in a transverse direction.
Figure 7B:
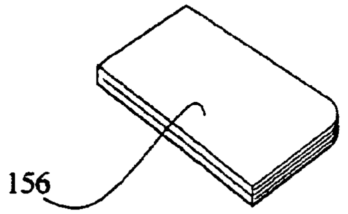

FIGS. 7A-7B illustrate another example of a foldable transaction card 150 having a magnetic stripe 151 and two fold lines 152, 154 that are disposed both longitudinally and transversely across the transaction card 150, thereby being disposed perpendicular to each other. The fold lines 152, 154 allow the transaction card 150 to be folded twice to form a folded transaction card 156 that protects the magnetic stripe 151, as illustrated in FIG. 7B.

Figure 8A:
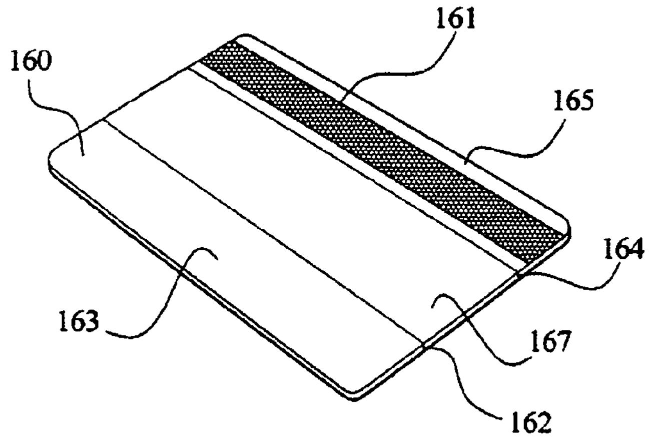
FIGS. 8A and 8B illustrate a transaction card having two longitudinal fold lines disposed parallel to edges of said transaction card thereby forming a foldable transaction card having three sections.
Figure 8B:
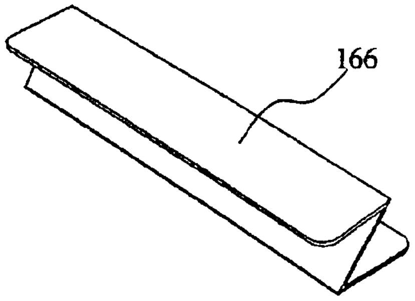

FIGS. 8A and 8B illustrate an alternate example of the present invention of a foldable transaction card 160 having a magnetic stripe 161 and two fold lines 162, 164 that are disposed longitudinally, but subdivide the transaction card 160 into three sections: a first section 163, a second section 165 and a third section 167. Alternatively, the transaction card 160 may have two fold lines that are disposed transversely across the transaction card but also subdivide the transaction into thirds (not shown). The fold lines 162, 164 allow the transaction card 160 to be folded twice to form a folded transaction card 166 that is small and compact and further that protects the magnetic stripe. The folded transaction card 166 may be folded as shown in FIG. 8B, which shows the transaction card 160 such that the outer sections 163, 165 of the transaction card 160 are folded inwardly on opposite sides of the middle of the three sections 167 in a "Z" configuration. Alternatively, the transaction card 160 may be folded such that the outer sections 163, 165 of the transaction card 160 may be folded inwardly on the same side of the middle section 167 (not shown). Of course, the fold lines 162, 164 may not subdivide the transaction card into thirds, but subdivide the transaction card into three unequal sections. In addition, additional fold lines may be provided such that the transaction card may be subdivided into four or more equal or unequal portions.

In an alternate example of the present invention, a transaction card, similar to the cards described above with respect to FIGS. 1A-8, may have a fold line disposed between at least first and second sections. Further, the transaction card may have a snap, button or other mechanism (collectively a "snap") which may hold the folded transaction card in a first engaged or locked position (collectively, the "engaged position"). The transaction card may not be usably accessible when the snap is in the engaged position. When the snap is actuated, the snap disengages or unlocks (collectively, the "dis-engaged position") and the second section of the transaction card unfolds into an "unfolded position". As noted, the fold line may be disposed either longitudinally or transversely across the face of the transaction card.

In the unfolded position, the transaction card becomes a full-sized financial transaction card and/or a card that may be used as a form of payment to conduct transactions and in standard financial transaction card readers, such as those at retail point-of-sale locations or ATM (cash) machines. In a preferred embodiment, when the second section is folded and is otherwise inaccessible, the external surface area of the card is approximately half compared to when the second section is usably accessible in the unfolded position. In an alternate embodiment, the transaction card can be refolded by folding the first and second sections in relation to one another and re-engaging the snap to keep the card folded. To allow folding, the first and second sections may be coupled by a flexible material or hinge. In an alternative embodiment, the card may have a plurality of folding sections.

Figure 9A:
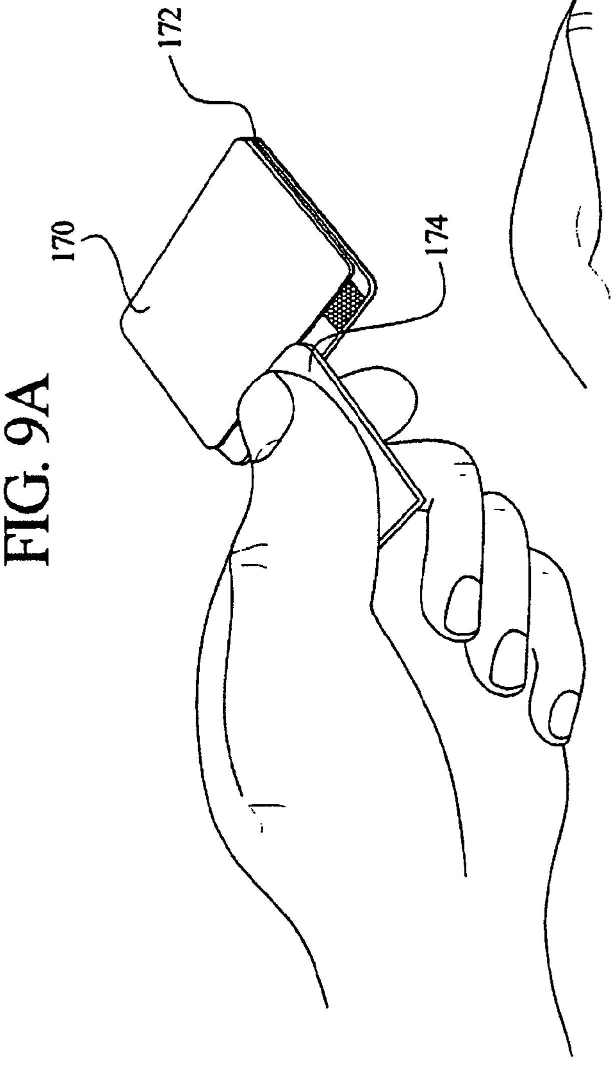
FIGS. 9A and 9B illustrate a foldable transaction card having a spring-loaded clip for holding said foldable transaction card in a folded state.
Figure 9B:
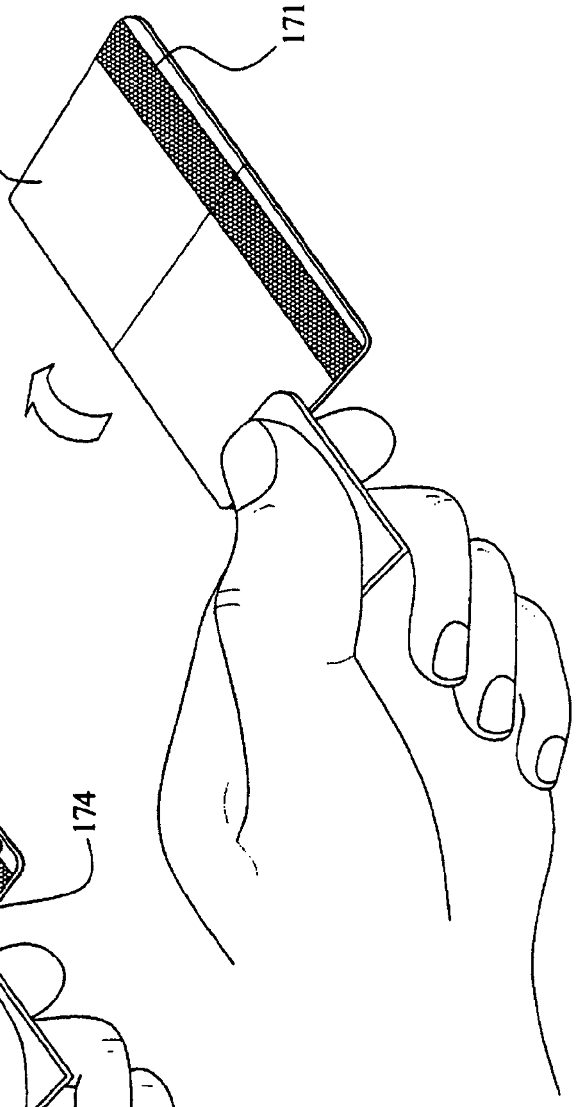

FIGS. 9A and 9B illustrate an alternate example of a foldable transaction card 170 having two sections 176, 178 separated by a fold line 172. The transaction card 170 may be maintained in a folded stated via a spring-loaded clip. By releasing the spring-loaded clip 174, the folded transaction card 170 may unfold along fold line 172 to form an unfolded transaction card 179 having a visible and usable magnetic stripe 171. The spring-loaded clip 174 may be disposed on a side 177 of the section 176 that forms a side of the transaction card 170 when in the unfolded state.

Figure 10:
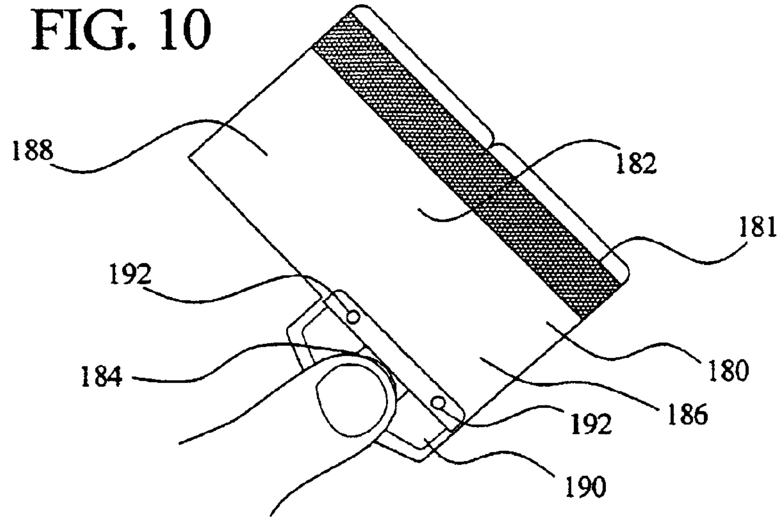
FIG. 10 illustrates a foldable transaction card having a spring-loaded clip and a holder for attaching to a ring or keychain.

Moreover, FIG. 10 illustrates a foldable transaction card 180 having two sections 186, 188 separated by a fold line 182. The transaction card 180 may be maintained in the folded stated via a spring-loaded clip 184. The transaction card 180 may be similar to the transaction card 170, as illustrated in FIGS. 9A and 9B, except the clip 184 may be disposed on a side 187 of the section 186 that forms the bottom of the transaction card (opposite the magnetic stripe 181). The spring-loaded clip 184 may be interconnected with a holder 190 having the spring-loaded clip 184 disposed thereon. The transaction card 180 may be interconnected with the holder 190 via pins 192, or via any other means that holds the transaction card 180 to the holder 190. The transaction card 180 may be removable from the holder 190 so that the transaction card 180 may be usable in any point-of-service machine, such as a payment machine or an automatic teller machine.

Alternatively, the transaction card 180 may be permanently attached to the holder 190. The holder may further be attachable to a key chain, or the like, such that keys or the like may be removably attached to the holder 190, thereby minimizing the chances that the transaction card 180 may be misplaced. In addition, the transaction card 180 may be easily accessible if attached to a keychain or the like.

On external surfaces of the transaction card 180 (on the face of the transaction card opposite the magnetic strip 181) there may be disposed a protective material, such as a metallized surface, or other surface, that protects the transaction card 180 when the transaction card 180 is in the folded state. Specifically, a material such as aluminized polyester may be utilized as a coating or external layer of the transaction card 180. As shown in FIG. 10, the magnetic stripe 181 may be disposed on an inside surface of the foldable transaction card 180 so that when folded, the magnetic stripe 181 is protected.

Figure 11A:
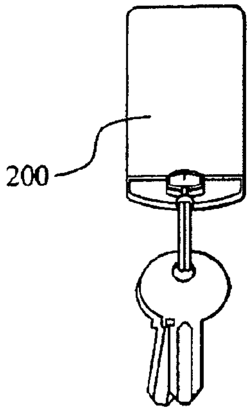
FIGS. 11A and 11B illustrate a transaction card foldable into thirds and having a spring-loaded clip and a holder for attaching to a ring or keychain.
Figure 11B:
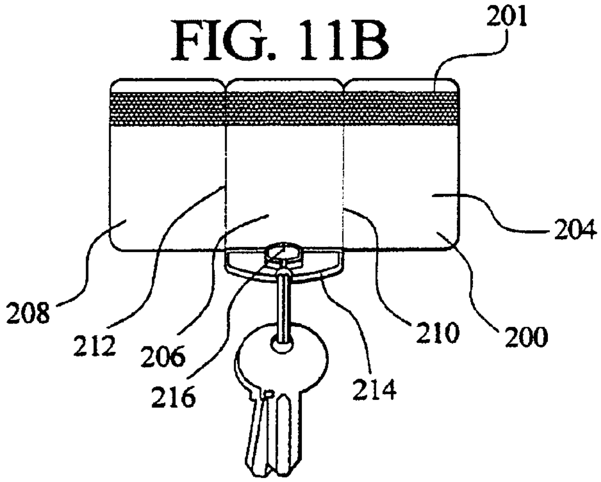

FIGS. 11A and 11B illustrate a still further example of the present invention that is similar to the example shown in FIG. 10. FIGS. 11A and 11B show a transaction card 200 having a magnetic stripe 201 that may have a folded state (as shown in FIG. 11A) or an unfolded state (as shown in FIG. 11B). The transaction card 200 may have three sections 204, 206 and 208 that are separated by fold lines 210, 212. The outer sections 204 and 208 may fold inwardly toward the center section 206 to form the folded transaction card 202, thereby protecting the magnetic stripe 201. In addition, the outside surface of the transaction card 200 (i.e., the surface opposite the magnetic stripe) may be made from a material that protects the transaction card 200, such as a metallized material. For example, the outside layer of the transaction card 200 may be made from aluminized polyester.

A holder 214 may be disposed on the transaction card 200 on the central section 206, such that when folded together to form the folded state, a spring-loaded clip 216 may hold the folded transaction card 200 together. Although the present example is shown with the holder 214 disposed on the central section 206, the holder 214 may be disposed on any of the sections 204, 206 or 208 such that when folded, the holder may hold the folded transaction card in place with the spring-loaded clip 216. When actuated, the spring-loaded clip allows the outer sections 204, 208 to unfold from the central section 206, thereby forming the transaction card 200 in the unfolded state. As with the transaction card 180, as shown in FIG. 10, the transaction card 200 may be detachable from the holder 214 such that the transaction card 200 may be utilized in a point-of-sale machine, such as an automatic teller machine.

In another embodiment, the transaction card has an associated holder, receptacle, pocket, or sleeve (collectively, the "carrier") that can fold in relation with the transaction card and in which the transaction card can be enclosed in whole or in part. The carrier itself may have a snap in an engaged or locked position such that in a first position, a second section of the carrier is folded in relation to a first section of the carrier (the "folded position of the carrier"), such that the transaction card is not usably accessible. When the carrier snap is actuated, the snap disengages or unlocks and the carrier second section unfolds in relation to the carrier first section, making accessible a foldable transaction card that simultaneously unfolds in relation to the carrier. The transaction card may be coupled to the carrier in a manner that allows it to be attached or detached. The carrier, in order to fold, may also have at least first and second sections coupled by a flexible material or hinge.

Figure 12A:
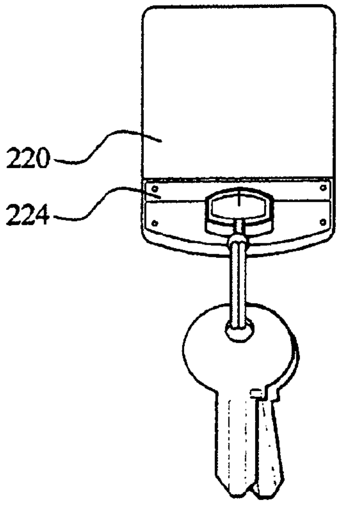
FIGS. 12A and 12B illustrate a foldable transaction card disposed in a foldable carrier, the foldable transaction card further having a spring-loaded clip and a holder for attaching to a ring or keychain.
Figure 12B:
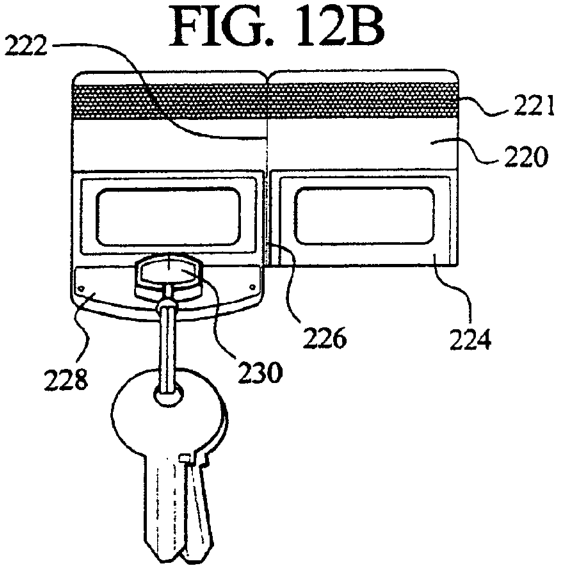

An example of this is shown in FIGS. 12A and 12B, which shows a transaction card 220 having a magnetic stripe 221 that may be in an unfolded state (as shown in FIG. 12B) or a folded state (as shown in FIG. 12A) due to a fold line or hinge 222. The transaction card 220 may be disposed within a carrier 224 that may also have a fold line or hinge 226. Both the transaction card 220 and the carrier 224 may fold via the fold lines 222 and 226, respectively, to allow the transaction card to be disposed in the folded state, as illustrated in FIG. 12A. Further, the transaction card 220, which is disposed within the carrier 224, may be interconnected with a holder 228 having a spring-loaded clip 230 which can hold both the carrier 224 and the transaction card 220 in the folded state. When the transaction card 220 is in the folded state and the clip 230 is actuated, the transaction card 220 and the carrier 224 may be unfolded. When the transaction card 220 and the carrier 224 are folded, the clip may lock the transaction card 220 into the folded state.

Both the transaction card 220 and the carrier 224 may be detachable from the holder 228. Alternatively, the transaction card 220 may only detachable from the carrier 224, thereby allowing the transaction card to be utilized in point-of-sale machines, such as ATMs. Alternatively, the transaction card 220 may be detachable and removable from the carrier 224, which may also be detachable and removable from the holder 228.

Although FIGS. 12A and 12B illustrate that the carrier 224 only covers a portion of the transaction card 220, the carrier 224 may cover more or less of the transaction card 220 than shown. For example, the carrier 224 may cover the entire surface of the transaction card 220 such that the transaction card 220 must be fully removable from the carrier 224 when utilized.

Alternatively, a transaction card may be foldable within a foldable carrier and slidable from the foldable carrier, such that the carrier and the transaction card together form a full-sized transaction card that may be utilized in point-of-sale machines. For example, a spring-loaded clip may be actuated thereby allowing a carrier and transaction card to unfold. Once unfolded, a slot may be exposed that allows a user of the transaction card to push the transaction card out of the carrier, thereby exposing the magnetic stripe. Alternatively, a button may be exposed whereupon actuating the button allows the transaction card to be slid from the carrier. However, the transaction card may not be fully removable from the carrier, but may merely be slidable such that a full-sized transaction card is made from the smaller-sized transaction card and the carrier.

The transaction card 220 may have a metallized surface such that the surface protects the transaction card 220. For example, the surface of the transaction card may be made from aluminized polyester. Alternatively, the carrier 224 may be metallized, or made from some other protective material, to protect the transaction card 220. When folded, the transaction card 220 protects the magnetic stripe 221.

Figure 13A:
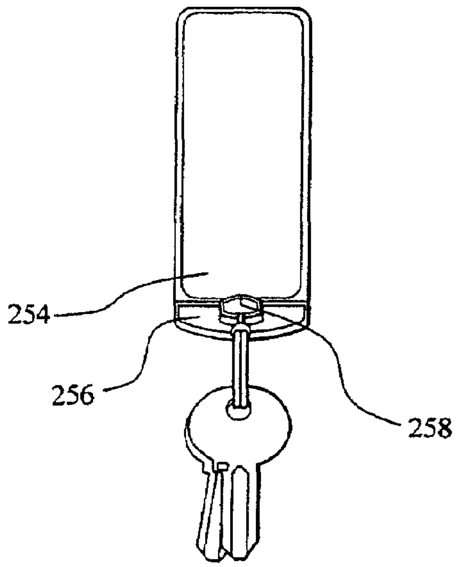
FIGS. 13A and 13B illustrate a foldable transaction card that is longitudinally foldable, the transaction card having a spring-loaded clip and a holder for a ring or keychain.
Figure 13B:
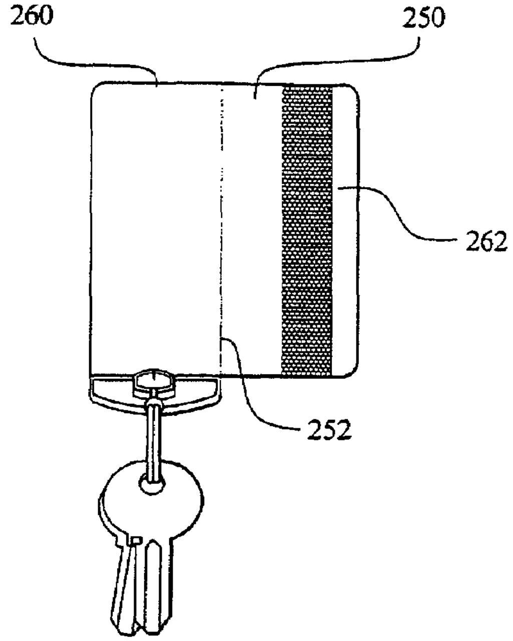

In an alternate example of the present invention, FIGS. 13A and 13B show a foldable transaction card 250 having a magnetic stripe 251 that may be foldable because of a fold line 252. The transaction card 250 may be disposed within a case 254 that is interconnected with a holder 256 having a spring-loaded clip 258. The case 254 may be formed like a clamshell, in that the transaction card 250 form the two halves of the case and the magnetic stripe 251 is exposed when the case 254 is opened. The bottom portion or first section 260 of the case 254 may have a portion of the transaction card 250 affixed thereto, or may be formed simply as a protective layer on the transaction card 250, such as aluminized polyester or the like. The top portion or second section 262 of the case 254 may also have a portion of the transaction card 250 affixed thereto, or may also be formed simply as a protective layer on the transaction card 250, such as aluminized polyester or the like. The spring-loaded clip 258 may hold the case 254 together when the case is in the folded state.

Figure 14A:
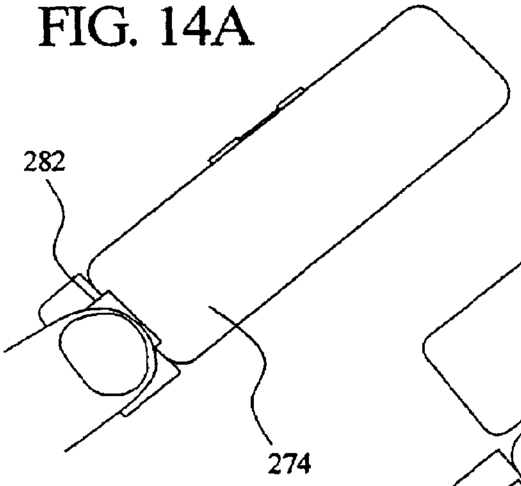
FIGS. 14A and 14B illustrate a longitudinally foldable transaction card disposed within a protective cover.
Figure 14B:
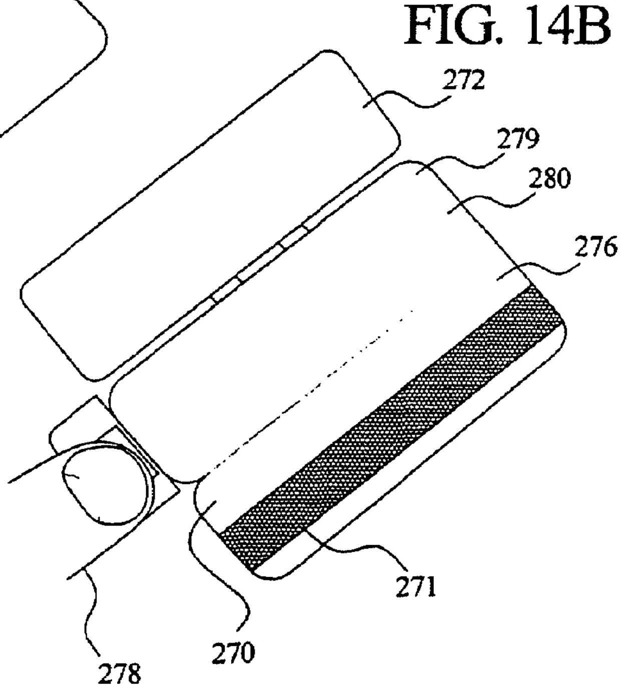

FIGS. 14A and 14B show an alternate example of a transaction card 270 having a magnetic stripe 271 that is similar to the transaction card 250, described above in relation to FIGS. 13A and 13B, except the transaction card 270 may have be disposed within a case 274 having a bottom portion or first section 280 of the case 274 and a protective cover or second section 272 of the case 274. The protective cover 272 may be made from metal, plastic or other material that will protect the foldable transaction card 270 contained therein. Specifically, the transaction card 270 may have a first section 279 and a second section 276, wherein the second section 276 has the magnetic stripe 271. The first section 279 may be integrally formed with or removably attached to the bottom portion 280 of the case 274. If the first section 279 is integrally formed with the bottom portion 280 of the case 274, it may have a metallized surface, or other protective surface, to protect the first section 279 of the transaction card 270 when the transaction card 270 is folded and the protective cover 272 is folded over the bottom portion 280.

When folded together, the transaction card 270 may be enclosed within the protective cover 272 and the bottom portion 280, as shown in FIG. 14A. When utilized, an individual may actuate a spring-loaded clip 282 that allows the protective cover 272 to open, thereby exposing the transaction card 270 therein. The first section 276 may then be unfolded, thereby exposing the magnetic stripe 271 to be utilized at a point-of-sale machine.

Figure 15A:
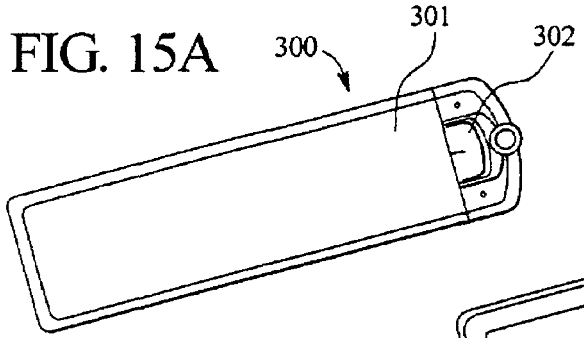
FIGS. 15A to 15D illustrate an embodiment of a foldable transaction card system.
Figure 15B:
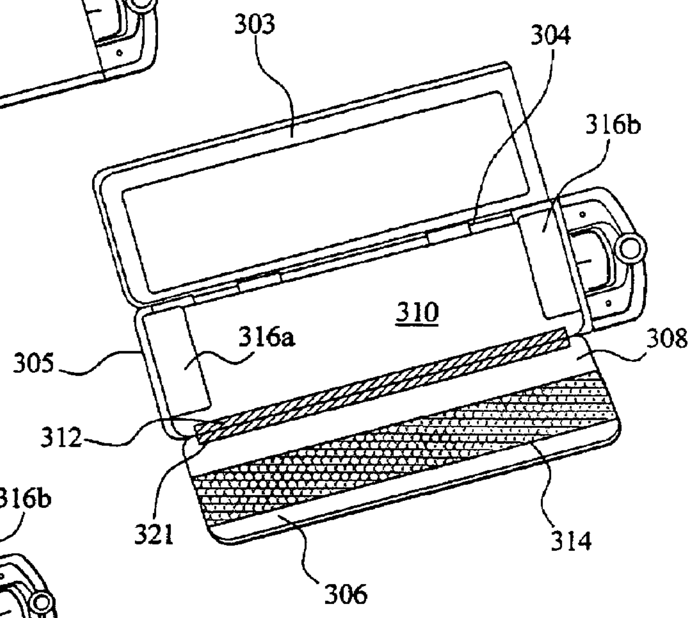

FIGS. 15A-15D illustrate an alternate example of a foldable transaction card system 300 that is similar to the foldable transaction card system 270, described above with reference to FIGS. 14A-14B. The foldable transaction card system 300 may comprise a case 301 and an actuator 302, such as a spring-loaded clip, a button or the like, that may be utilized to open the case 301, as illustrated in FIG. 15B, via a hinge 304. The hinge 304 may be tensioned to automatically shut when not held open. Alternatively, the hinge 304 may be tensioned to automatically open when the actuator 302 is actuated. The case 301 includes a lid 303 and a base 305 interconnected via the hinge 304.

A foldable transaction card 306 may be contained within the case 301. The foldable transaction card 306 may have a first section 310 and a second section 308 that may be interconnected via a transaction card hinge 312. The transaction card hinge 312 may comprise a line of weakness disposed in the one or more layers of the transaction card 306. Alternatively, the hinge 312 may comprise a hinge material 321, such as a polymeric material, a fabric, or some other equivalent reinforcing material, which may be disposed over the line of weakness or space between the first section 310 and the second section 308. Preferably, the hinge material may be a thermoplastic polymeric sheet or film, such as, for example, polypropylene, that may be adhered to both the first section 310 and the second section 308 to allow the first section 310 and the second section 308 to fold relative to each other.

Figure 15C:
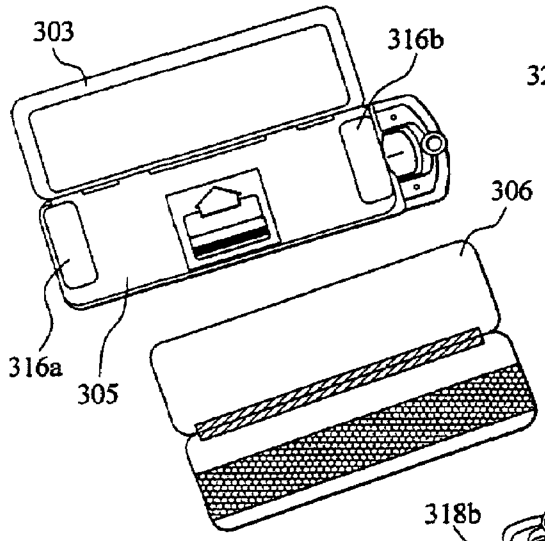
Figure 15D:
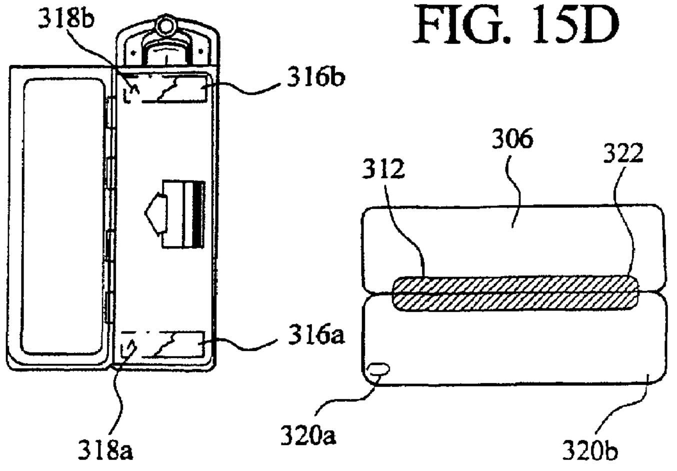

Further, disposed on an opposite side of the transaction card 306 may be a further hinge material 322, as illustrated in FIG. 15D, that may allow the first section 308 and the second section 310 to be foldable relative to each other. The further hinge material 322 may be any material, such as a polymeric material, a fabric, or other like material, similar to the hinge material 321, described above. The further hinge material 322 may further be a softer and more elastic material than the hinge material 321 so as to allow the transaction card 306 to be folded to protect a magnetic stripe 314 that may be disposed on the same side of the transaction card 306 as the hinge material 321. The further hinge material 322 may preferably be a nitrile or neoprene elastomeric material that can easily stretch when the transaction card 306 is folded and yet retains its shape when the transaction card 306 is unfolded.

Of course, the transaction card 306 may include a magnetic stripe 314 or other features not shown that are typically contained on a transaction card, such as a holographic security indicator, embossed alpha-numeric characters, graphics, a signature panel, microchip or other like feature.

The transaction card 306 may be disposed within the case 301 and held within the case 301 via tracks 316*a*, 316*b* within which the transaction card 306 may be slid. In addition, the transaction card 306 may be removable from the tracks 316*a*, 316*b* so that the transaction card 306 may be fully removable from the case 301, as illustrated in FIG. 15C.

FIG. 15D illustrates the case 301 having the tracks 316*a*, 316*b* cut-away to reveal tabs 318*a*, 318*b* that may be disposed within the tracks 316*a*, 316*b* that may engage with the transaction card 306 when the transaction card 306 is slid within the tracks 316*a*, 316*b*. The tabs 318*a*, 318*b* may engage recesses 320*a*, 320*b* that may be disposed on or within the first section 310 of the transaction card 306. The tabs 318*a*, 318*b* may hold the transaction card 306 within the case 301, thereby keeping the transaction card 306 from falling out of the case 301 when the case 301 is opened. However, the transaction card 306 may be easily removable from the case when desired by the card user by pulling the transaction card 306 from the case 301 and sliding the transaction card 306 out of the tracks 316*a*, 316*b*.

FIGS. 16A-16C illustrate an alternate example of a foldable transaction card system 350 comprising a case 351, having a lid 353 and a base 355. The lid 353 and the base 355 may be separated by a hinge 354 that is preferably tensioned so as to automatically close the lid 353 upon the base 355. Therefore, to open the case 351, an individual must merely swing the lid 353 from the base 355 against the tension of the hinge 354, thereby allowing a foldable transaction card 356 to be exposed.

The foldable transaction card 356 may have a first section 360 and a second section 358 that are interconnected via a transaction card hinge 362. The transaction card hinge 362 may be similar, if not identical, to the transaction card hinge 312, as described above with reference to FIGS. 15A-15D.

The foldable transaction card 356 may be contained within the case 351 by being disposed within tracks 366*a*, 366*b*. The tracks may engage the foldable transaction card 356 when the foldable transaction card 356 is slid within the tracks 366*a*, 366*b*. Moreover, tabs (not shown) may be disposed within the tracks, and may be similar, if not identical, to the tabs 318*a*, 318*b* as described above with reference to FIG. 15D. Moreover, the foldable transaction card may have recesses (not shown) substantially as described above with reference to the foldable transaction card 306 described above.

In use, the lid 353 may be swung from the base 355 to expose the foldable transaction card 356 contained therein. The foldable transaction card, having the transaction card hinge 362 may be opened to expose a magnetic stripe 364 disposed on or within the foldable transaction card 356. The unfolded transaction card may be swiped or otherwise utilized at a point-of-sale device while remaining disposed within the case 351. Alternatively, the transaction card 356 may be removed from the case 351 to be utilized, such as being physically disposed within a point-of-sale device, such as an automated teller machine, or the like.

Figure 17:
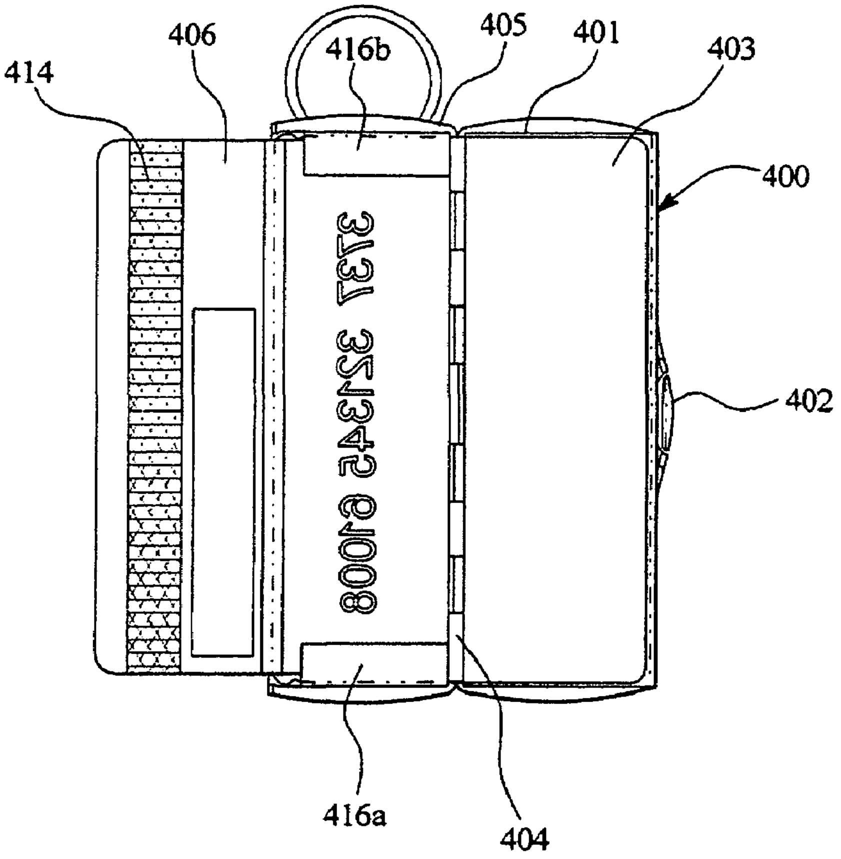
FIG. 17 illustrates an alternate embodiment of a foldable transaction card system having an actuating means disposed on an edge of a case for opening the case and accessing the transaction card disposed therein.

FIG. 17 illustrates an alternate embodiment of a foldable transaction card system 400 of a foldable case 401 having a lid 403 and a base 405 separated by a hinge 404. A foldable transaction card 406 may be disposed within tracks 416*a*, 416*b* so as to be removable from the case 401 when the case 401 is unfolded. The case 401 further has an actuator 402 disposed on the edge of the lid 403 for allowing the case 401 to be opened when the actuator is actuated. Specifically, the lid 403 and the base 405 may remain together when the case 401 is folded by an engaging means, such as a clip or other like device. By actuating the actuator 402, the engaging means may release, thereby allowing the lid 403 to swing away from the base 405. The hinge 404 may be spring-loaded, thereby allowing the lid 403 to easily and automatically swing away from the base 405. The foldable transaction card 406 contained therein may be unfolded via a transaction card hinge 412, thereby exposing the magnetic stripe 414. The foldable transaction card 406 may then be utilized. Alternatively, the foldable transaction card 406 may be removed from the case 401 and utilized.

The foldable transaction card 406 may be removably disposed within the case 401 in a similar manner as described above with reference to FIGS. 15A-15D and FIGS. 16A-16C. Specifically, the foldable transaction card 406 may be contained within the case 401 by being disposed within the tracks 416*a*, 416*b*. The tracks may engage the foldable transaction card 406 when the foldable transaction card 406 is slid within the tracks 416*a*, 416*b*. Moreover, tabs (not shown) may be disposed within the tracks 416*a*, 416*b*, and may be similar, if not identical, to the tabs 318*a*, 318*b* as described above with reference to FIGS. 15A-15D. Moreover, the foldable transaction card may have recesses (not shown) substantially as described above with reference to the foldable transaction card 306 described above in FIG. 15D.

Figure 18A:
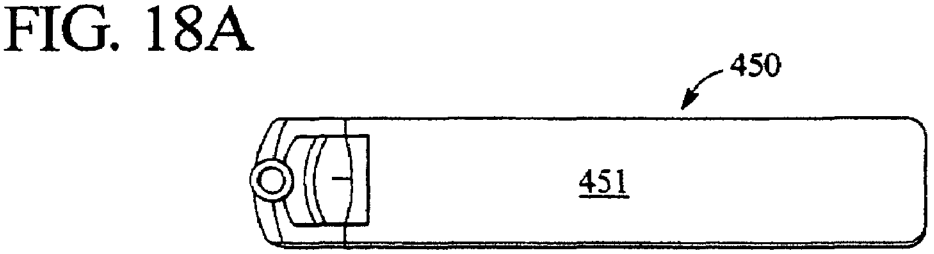
FIGS. 18A to 18C illustrate an alternate embodiment of a foldable transaction card system for a tri-foldable transaction card.
Figure 18B:
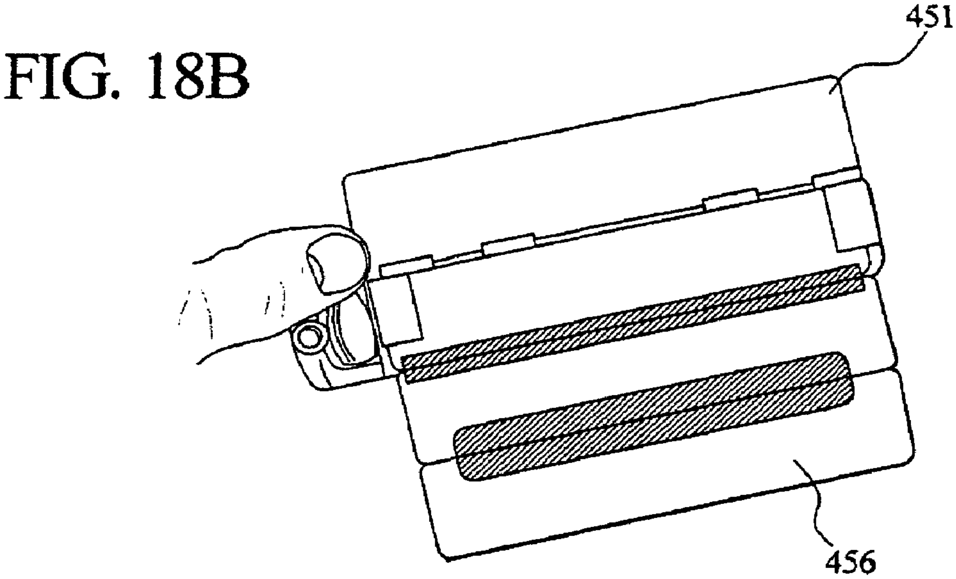
Figure 18C:
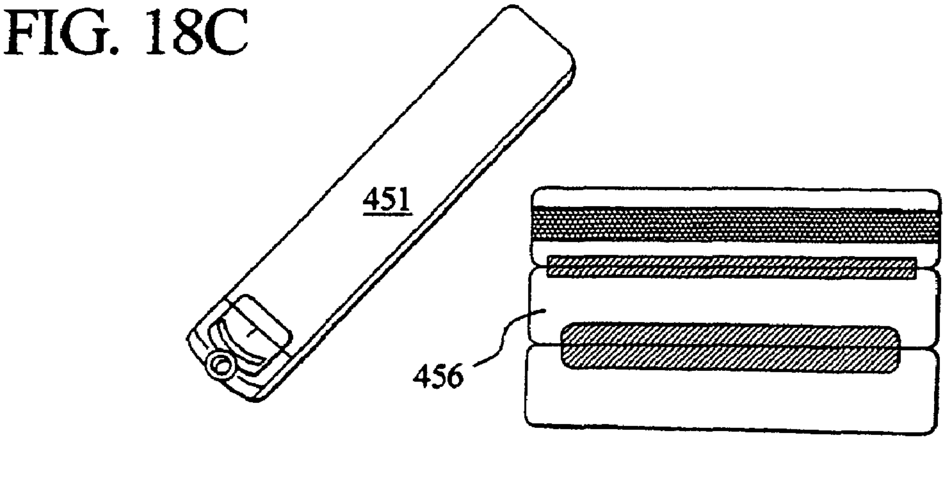

FIGS. 18A-18C illustrate an alternate embodiment of a foldable transaction card system 450 substantially similar to the foldable transaction card system 300 illustrated above with respect to FIGS. 15A-15D, including an actuator 452 substantially similar to the actuator 302 described above. However, the system 450 may comprise a case 451 that may be smaller in width than the case 301. The foldable transaction card 456 disposed within the case 451 may be tri-folded, thereby providing a folded transaction card that takes up less width space, thereby allowing a smaller case 451 to be utilized. As with the foldable transaction card 306, described above, a foldable transaction card 456 may be usable within the case 401, as illustrated in FIG. 18B, or may be completely removed from the case 401, as illustrated in FIG. 18C.

Figure 19:
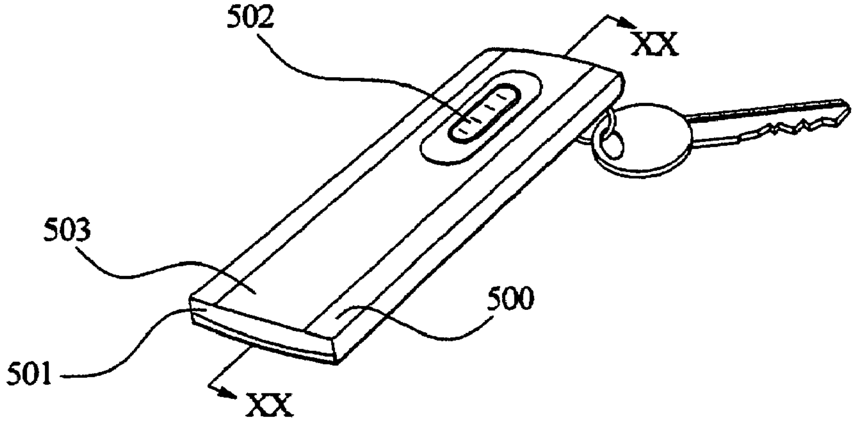
FIG. 19 illustrates a further alternate embodiment of a foldable transaction card system having an actuating means disposed on a surface of a case for opening the case and accessing the transaction card disposed therein.

FIG. 19 illustrates an alternate embodiment of a foldable transaction card system 500 of a case 501 having a foldable transaction card contained therein (not shown), which is substantially similar to the foldable transaction card system 400, described above with reference to FIG. 17. However, the foldable transaction card system 500 includes an actuator 502 disposed on a surface of a lid 503 of the case 501, having the foldable transaction card (not shown) contained therein. The actuator 502 may be disposed such that the actuator does not protrude greatly or at all from the surface of the lid 503. By actuating the actuator the case 501 may be opened to access the foldable transaction card (not shown) that may be contained therein.

Figure 20A:
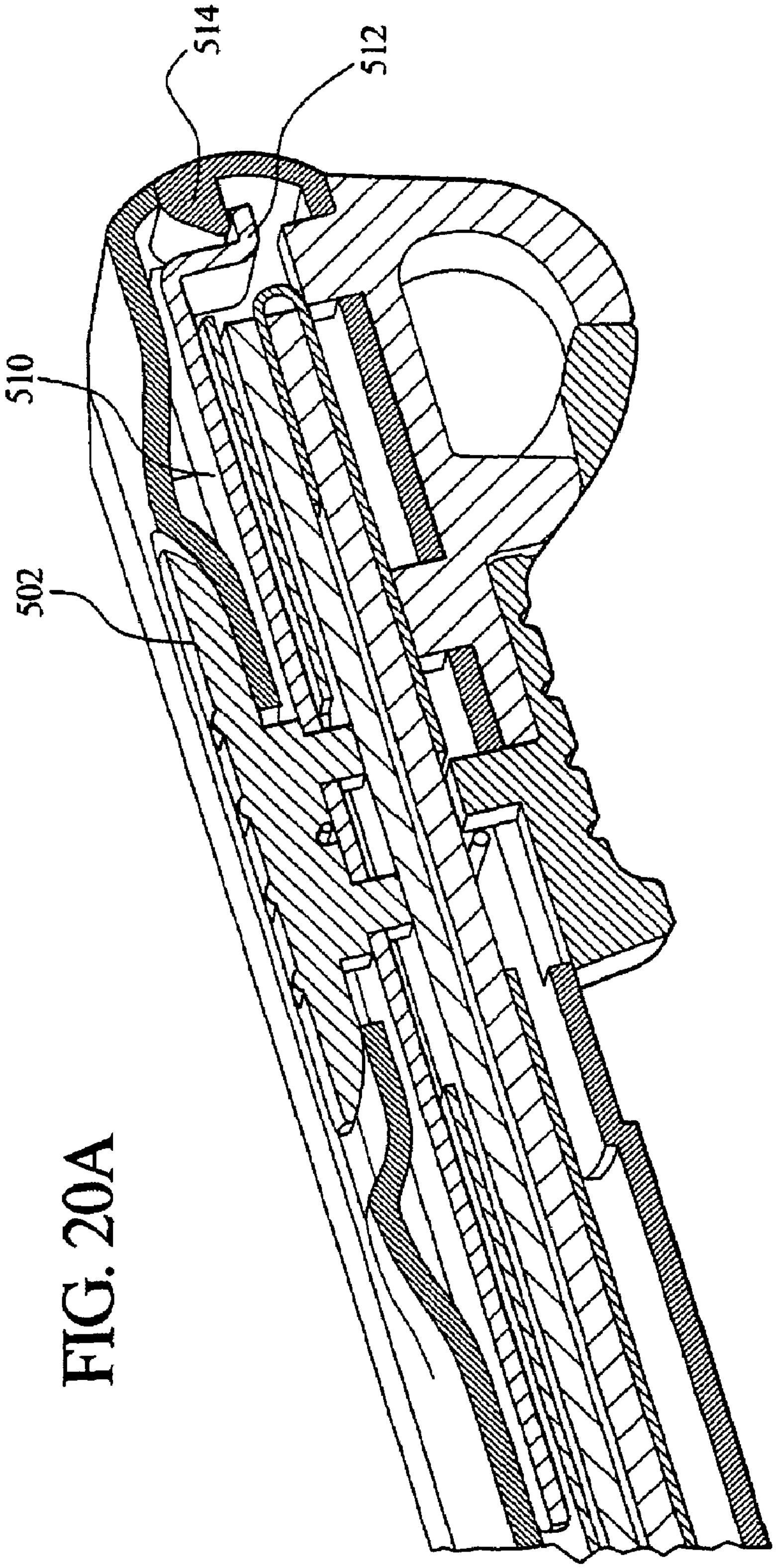
FIGS. 20A and 20B illustrates a cross-sectional view of the foldable transaction card system in the alternate embodiment.
Figure 20B:
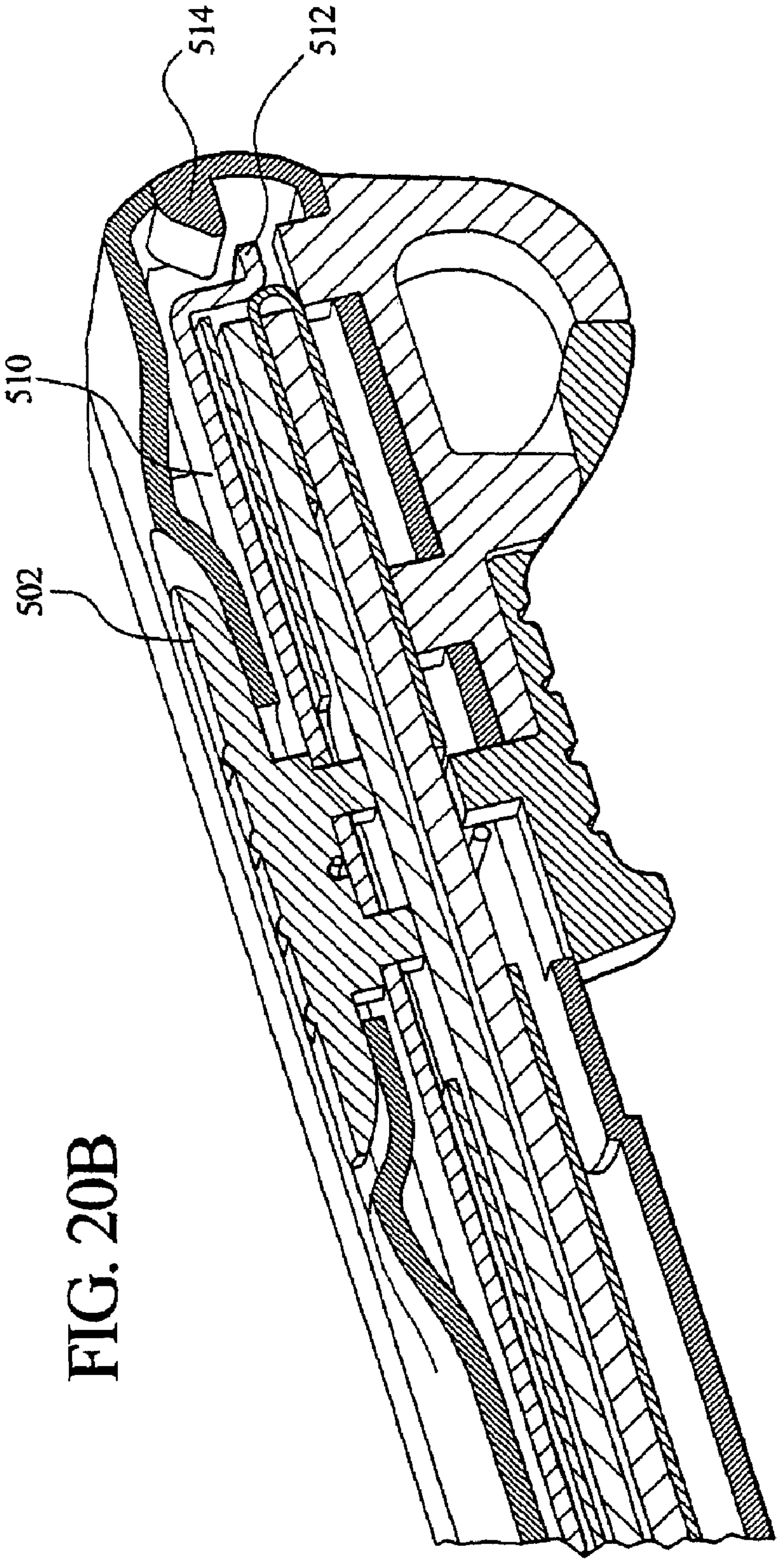

FIGS. 20A-20B illustrate cross-sectional views of the case 501 illustrating the actuator that allows the case 501 to open when the actuator 502 is actuated. Specifically, FIG. 20A illustrates the actuating mechanism when the case 501 is closed. The actuator 502 is interconnectedly engaged with an arm 510 having an end 512 that may be configured to engage a tab 514. The end 512 of the arm 510 engages the tab 514 to keep the case 501 from opening. When the actuator 502 is actuated, by depressing the actuator 502 or otherwise moving the actuator 502, the end 512 of the arm 510 may disengage from the tab 514, thereby allowing the case 501 to open, exposing the foldable transaction card contained therein. For example, as illustrated in FIG. 20B, the actuator 510 may be moved with a thumb or finger, thereby moving the arm 510 and disengaging the end 512 of the arm 510 from the tab 514.

Figure 21A:
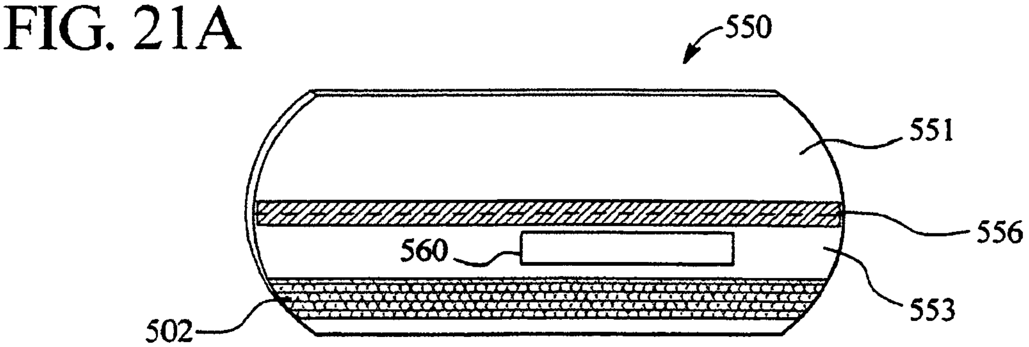
FIGS. 21A to 21C illustrate an alternate embodiment of a foldable transaction card.
Figure 21B:
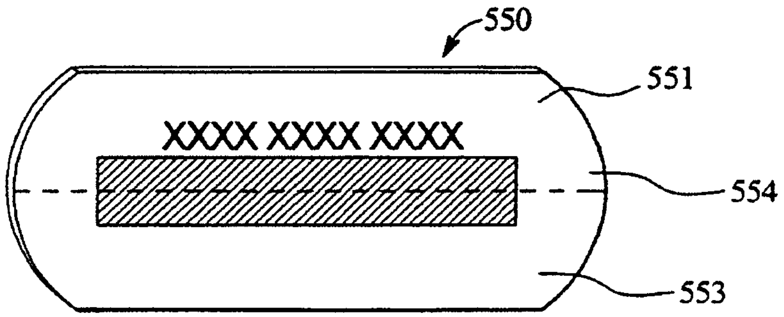

FIGS. 21A-21B illustrates an alternate embodiment of a foldable transaction card 550 having a shape different from that of a traditional transaction card. The foldable transaction card 550 includes features common to traditional transaction cards, such as a signature panel 560 and a magnetic stripe 562. Of course, other features common to traditional transaction cards may also be included, such as holographic images useful as security indicators, embedded microchips, or other like features.

Figure 21C:
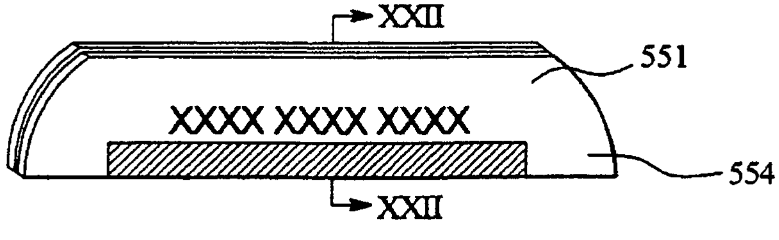

Specifically, the transaction card 550 comprises two halves 551, 553 that may be attached together via a hinge material 554 and a hinge backing material 556. The hinge material 554 may comprise an elastomeric material, such as a nitrile or neoprene elastomeric material, that may be disposed between the two halves 551, 553. Of course, any other hinge material is contemplated that may attach the two halves 551, 553 together, thereby allowing the transaction card 550 to fold. The hinge material 554 may, therefore, stretch when the foldable transaction card 550 is folded but retain its shape when the transaction card 550 is unfolded. Typically, the foldable transaction card 550 is folded such that the signature panel 560 and the magnetic stripe 562 are disposed within the folded transaction card, thereby protecting the signature panel and, especially, the magnetic stripe. The hinge backing material 556 may be provided on an opposite side of the transaction card 550 to provide reinforcement so that the two halves 551, 553 do not separate. Typically, the hinge backing material may be polypropylene, or other thermoplastic material that reinforces the hinge created between the two halves 551, 553 of the foldable transaction card 550. Of course, other materials are contemplated that can reinforce the hinge created between the two halves 551, 553. FIG. 21C illustrates the foldable transaction card 550 folded.

The foldable transaction card 550 may be any size. Preferably, the foldable transaction card 550 may have one or more dimensions smaller than traditional transaction cards when in an unfolded state. Specifically, a traditional transaction card may be about 3⅜ inches long and about 2¼ inches wide. The foldable transaction card 550 may have a greatest length (measured from the middle of the foldable transaction card 550) that is less than 3⅜ inches. Particular embodiments illustrating non-traditionally-sized transaction cards are described herein with reference to FIGS. 24-28, as described below.

Figure 22:
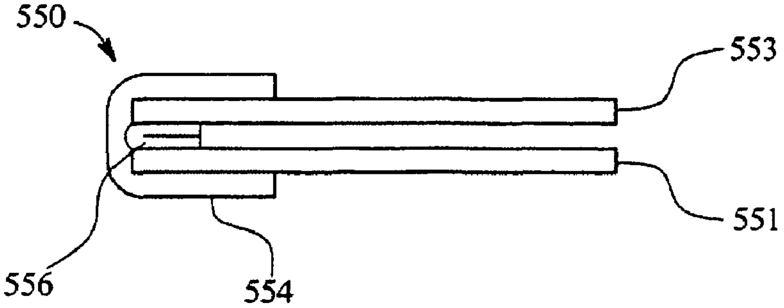
FIG. 22 illustrates a cross-sectional view of the foldable transaction card in the alternate embodiment.

FIG. 22 illustrates a cross-sectional view of the transaction card 550 folded, thereby illustrating the hinge material 554 and the hinge backing material 556 utilized to create the hinge in the foldable transaction card 550. Specifically, the hinge material 554 is stretched when the transaction card 550 is folded. Because the hinge material 554 may be made from an elastomeric material, the hinge material 554 may stretch when the transaction card 550 is folded and then may retain its original shape when the transaction card 550 is unfolded.

Figure 23:
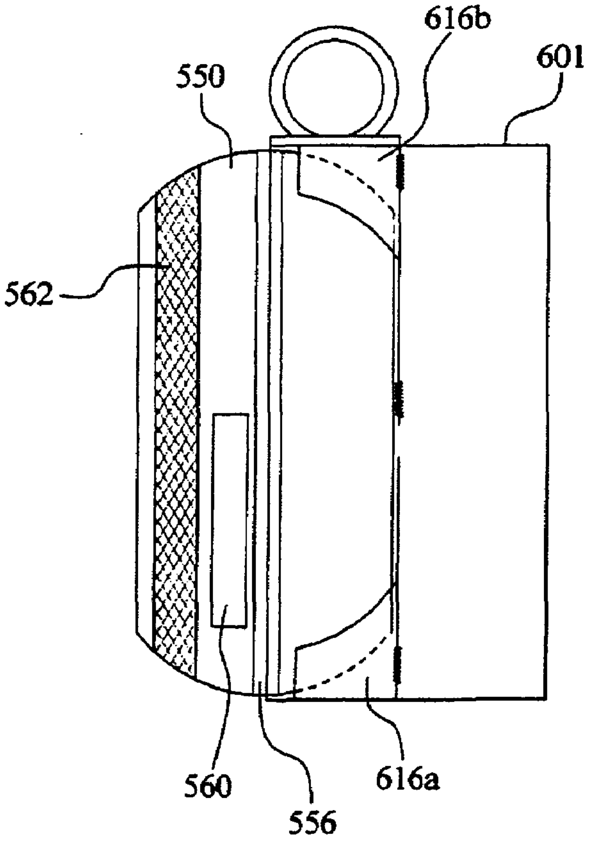
FIG. 23 illustrates a still further alternate embodiment of a foldable transaction card system.

FIG. 23 illustrates a foldable transaction card system 600 incorporating the foldable transaction card 550, described above with respect to FIGS. 21A-21C and FIG. 22. The foldable transaction card 550 may include the signature panel 560 and the magnetic stripe 562. Moreover the foldable transaction card system 600 may include a case 601 that is substantially similar to the foldable transaction card system 400, described above with reference to FIG. 17. However, the case 601 may include tracks 616*a*, 616*b* that are generally shaped like the edges of the foldable transaction card. Specifically, since the edges of the foldable transaction card 550 may have curved edges, rather than straight edges, which would be typical for a traditional transaction card, the tracks 616*a*, 616*b* may also be curved to follow the curve of the transaction card 550. Alternatively, the tracks 616*a*, 616*b* may be any other shape to hold the transaction card 550 therein. In addition, since the foldable transaction card 550 may have at least one dimension that is smaller than traditional transaction cards, the case 601 may be smaller than if a traditionally-sized transaction card was utilized.

The transaction cards of the present embodiment described herein may have lengths and widths that are smaller or larger than traditional transaction cards. More specifically, a traditional transaction card may have a length of about 3⅜ inches and a width of about 2¼ inches. Therefore, a transaction card having a length, for example, of less than 3⅜ inches may allow for a smaller foldable transaction card system when the transaction card has a fold therein and is disposed within a case, as described above. FIGS. 24-28 Illustrate various embodiments of transaction cards that may be utilized herein having dimensions, i.e., lengths and widths, that are non-traditional.

Figure 24:
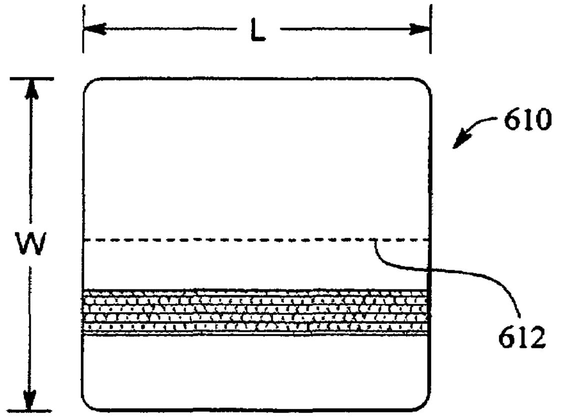
FIGS. 24-28 illustrate still further alternate embodiments of non-traditionally-sized and shaped transaction cards that may be utilized in embodiments described herein.

The transaction card 610 shown in FIG. 24 has a width (W) of less than approximately 1 inch and a length (L) of also less than approximately 1 inch. For example, as shown in FIG. 24, the transaction card 610 is generally square and the width W could be approximately ¾ inch and the length L could also be approximately ¾ inch. A fold line 612 may be disposed within the transaction card 610, as described above.

Figure 25A:
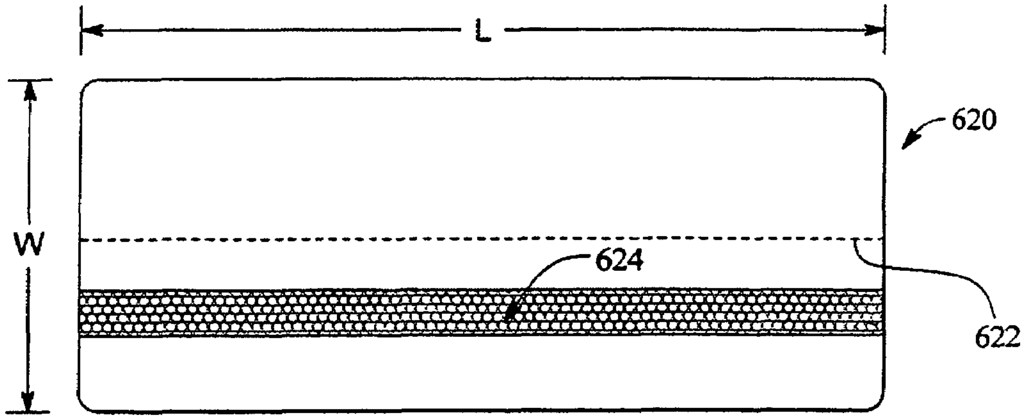
Figure 25B:
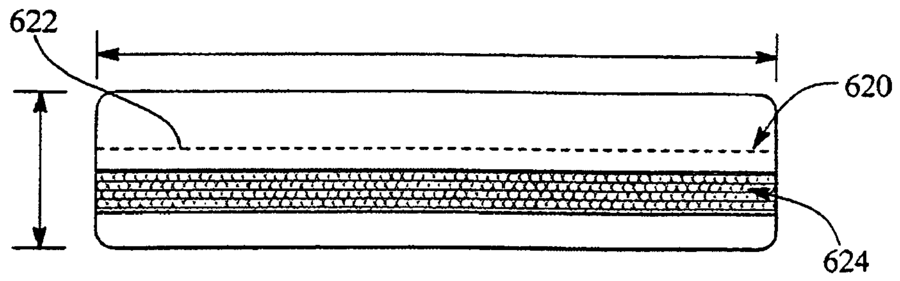

FIGS. 25A and 25B illustrate alternate embodiments of a transaction card 620 having a magnetic stripe 624 that is parallel to a side 626 of the transaction card 620. The transaction card 620 may be made from the same or similar materials as the transaction card 610 described above with reference to FIG. 1. In addition, the transaction card 620 may have a fold line 622 disposed within the transaction card 620, as described above.

The transaction card 620 shown has a width (W) and a length (L). In this particular embodiment, the transaction card 620 has a length L of greater than 3 inches, and more preferably of greater than approximately 3⅜ inches. For example, as shown in FIG. 25A, the transaction card 620 may have a width W of approximately 2 inches and a length L of approximately 4 inches. Alternatively, as shown in FIG. 25B, the width could be approximately 1 inch and the length L could be approximately 3⅞ inches. Therefore, the transaction card 20 may be longer than a standard transaction card, but narrower than a standard transaction card. This may allow the transaction card 620 to be kept or stored in locations where the widthwise dimension limits the storage capability of the transaction card 620.

Figure 26A:
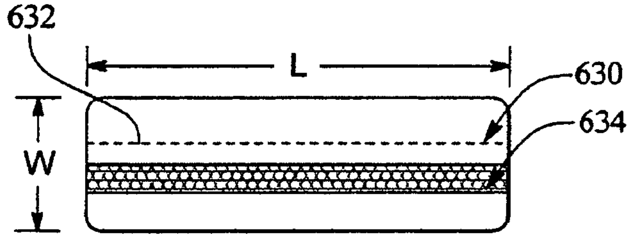
Figure 26B:
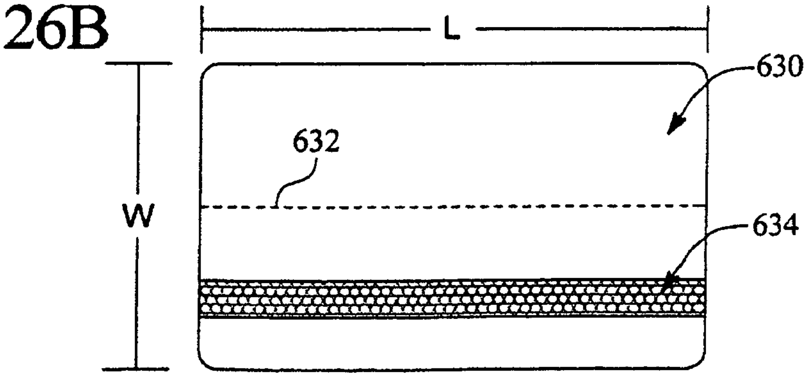

FIGS. 26A and 26B illustrate further alternate embodiments of a transaction card 630 having a magnetic stripe 634 that is parallel to a side 636 of the transaction card 630. The transaction card 630 may be comprised of the same materials as described above with reference to the transaction card 610. In addition, the transaction card 630 may have a fold line 632 disposed within the transaction card 630, as described above.

The transaction card 630 shown has a width (W) and a length (L). In the embodiment described herein with reference to FIGS. 26A and 26B, the transaction card 630 has a length L of between approximately 1 inch and approximately 3 inches and a width W of less than approximately 1 inch or greater than approximately 1⅞ inches. For example, as shown in FIG. 26A, the transaction card 630 may have a width W of approximately ¾ inch and a length L of approximately 2¼ inches. Alternatively, as shown in FIG. 26B, the width W could be approximately 2⅛ inches and the length L could be approximately 3 inches.

Figure 27:
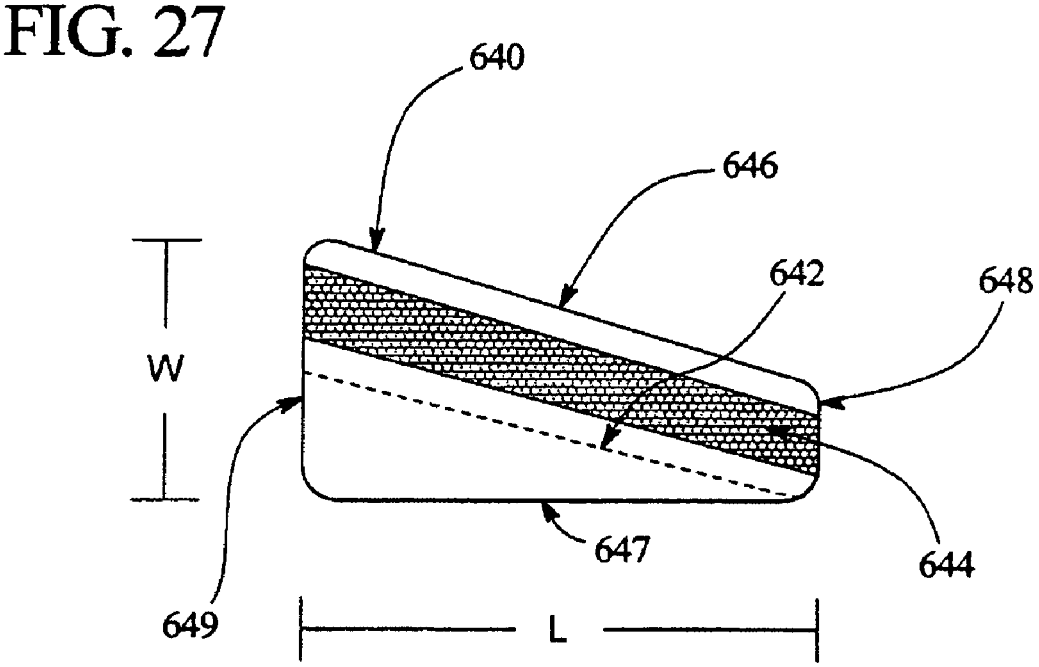

FIG. 27 illustrates an alternate embodiment of a transaction card 640 having a magnetic stripe 644 that is parallel to a side 646 of the transaction card 640. Alternately, the magnetic stripe may be parallel to one of the other sides 647, 648 or 649. The transaction card 640 may be comprised of the same or similar materials as that of the transaction card 610. In this particular embodiment, the transaction card 640 has at least one set of opposing sides 646 and 647, or 648 and 649 that is not parallel. In addition, the transaction card 640 may have a fold line 642 disposed within the transaction card 640, as described above.

The transaction card 640 shown has a width (W) and a length (L). The card 640 has a length L of between approximately 1 inch and approximately 1⅞ inches or a length L of greater than approximately 3 inches, and more preferably of greater than approximately 3⅜ inches. In addition, the width W is less than approximately 1 inch or greater than approximately 1⅞ inches. For example, as shown in FIG. 27, the transaction card 640 may have a width W of approximately ¾ inch and a length L of approximately 1½ inches. Alternatively, the width W could be approximately 2 inches and the length L could be approximately 3½ inches.

Figure 28:
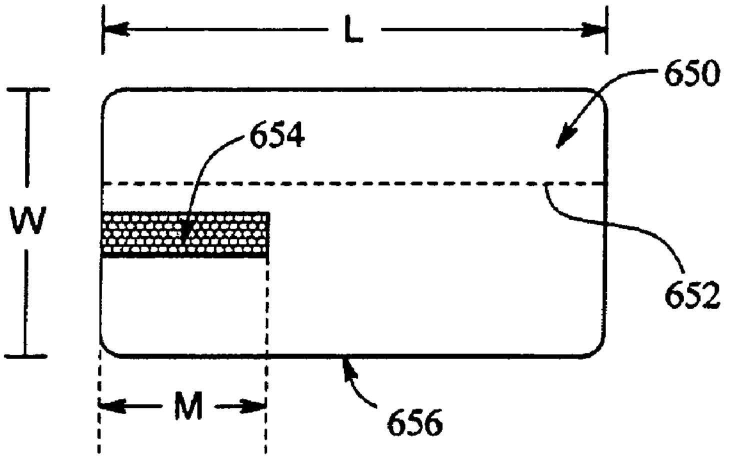

FIG. 28 illustrates an alternate embodiment of a transaction card 650 having a magnetic stripe 654 that is parallel to a side 656 of the transaction card 650. The transaction card 650 may comprise the same or similar material as that described above with reference to the transaction card 610, as noted above of the same or similar construction to the transaction card 610 described above. In addition, the transaction card 650 may have a fold line 652 disposed within the transaction card 650, as described above.

The transaction card 650 may have any length L or width W, so long as the card 650 has a magnetic stripe 652 of length M, which is less than approximately 1 inch. Alternatively, the transaction card 650 may have any length L or width W, so long as the length M of the magnetic stripe 654 is greater than approximately 3 inches long and preferably greater than approximately 3⅜ inches long.

As noted above, each embodiment of a non-traditionally sized transaction card (i.e., having dimensions larger or smaller than traditionally-sized transaction cards) may have a fold line disposed therein and a hinge material that allows the transaction card to fold and unfold. The foldable non-traditionally sized transaction card may be incorporated into a foldable transaction card system, whereby the foldable transaction card has a case or housing for holding and/or storing the foldable transaction card. The non-traditionally sized foldable transaction card allows for the use of cases that are smaller in a certain dimension, such as a length and/or width, thereby providing transaction card systems that may be smaller, and more usable, especially when incorporated onto a keychain or other like connecting means. Of course, other sizes and shapes of transaction cards may be utilized in the present invention to arrive at a foldable transaction card system that is compact and convenient.

In an alternate embodiment of the present invention, a foldable transaction card system may be combined with a money clip. For example, the embodiments described herein of a foldable transaction card and case or housing may include a money clip on a surface of the case or housing for holding and/or storing currency, or other like material. Moreover, the foldable transaction card systems may further be combined with a mobile telephone, such as a cellular telephone, or other personal communication device, such that the foldable transaction card may be removably attached to a housing or case that may be interconnected with the mobile telephone. Of course, foldable transaction card systems may be incorporated into other items as well, such as personal digital assistants ("PDAs") or other like devices.

For example, FIGS. 29A-29C and 30A-30G illustrate embodiments of transaction cards and transaction card systems interconnected with a portable electronic device. Specifically, the portable electronic device is a mobile telephone. Although the embodiment described herein within respect to FIGS. 29A-29C and 30A-30G are specifically described with respect to a mobile telephone, it should be noted that the transaction cards or transaction card systems may be interconnected with any portable electronic device, such as, for example, a PDA or other portable computing means.

Figure 29C:
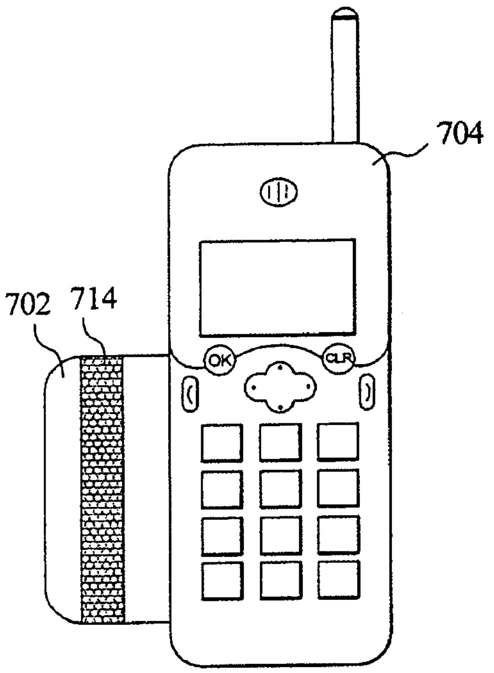
FIGS. 29A-29C illustrate a further alternate embodiment of the present invention of a transaction card removably attached to a cellular telephone.
Figure 29A:
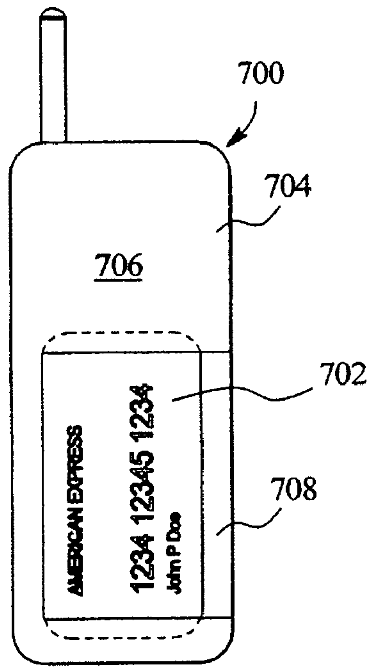
Figure 29B:
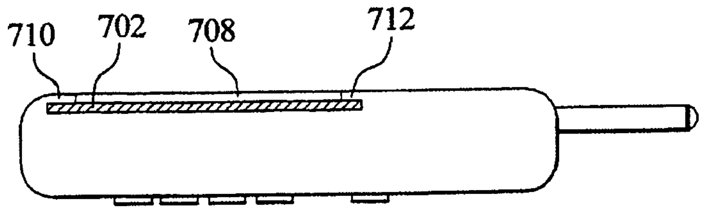

FIGS. 29A-29C illustrates a transaction card system 700 comprising a transaction card 702 interconnected with a mobile telephone 704. Specifically, the transaction card 702 may be disposed within a backside 706 of the mobile telephone 704, although the location of the transaction card within the mobile telephone 704 is not important, and the transaction card may be in any convenient location on or within the mobile telephone 704. As with the other embodiments described herein, the transaction card may be a full-size transaction card, or may be any other size to be housed within the mobile telephone 704, as described herein. Specifically, the transaction card 702 may have at least one dimension smaller than a traditional transaction card. In the specific embodiment shown in FIGS. 29A-29C, the transaction card 702 is disposed within a slot 708 provided within the backside 706 of the mobile telephone 704, such that the transaction card 702 may be easily slid from the slot 708 when utilized. Two tabs 710, 712 may be provided integral with the slot for holding the transaction card 702 in place.

When slid from the slot 708, the transaction card 702 may be partially removed from the slot, as illustrated in FIG. 29C. This allows only a magnetic stripe 714, or any other feature, to be exposed when partially slid from the slot 708 thereby allowing the magnetic stripe to be accessible, such as when swiped in a point-of-sale device. Alternatively, the transaction card 702 may be fully slid from the slot 708, whereupon the transaction card 702 may be utilized like a typical transaction card, such as in point-of-sale devices, ATMs or the like.

FIGS. 30A-30G illustrate a still further alternate embodiment of the present invention of a transaction card system 750 comprising a transaction card housing 752 interconnected with a mobile telephone 754. Specifically, the transaction card housing 752 may be connected with or attached to a backside 756 of the mobile telephone 754, although the exact location of the transaction card housing 752 may be in any location of the mobile telephone. As noted above, although the embodiments are described with respect to a mobile telephone, the transaction card housing may be connected with any type of portable electronic device, such as a PDA or other portable computing means.

The transaction card housing 752 may be substantially similar to, if not exactly the same as, the numerous transaction card housing described above. For illustration purposes, the transaction card housing 752 is most similar to the foldable transaction card system described with respect to FIGS. 15A-15D and FIG. 19. Specifically, the transaction card housing 752 may comprise a foldable transaction card 758 that may be removably disposed within the case 752 in a similar manner as described above with reference to FIGS. 15A-15D. Specifically, the foldable transaction card 758 may be contained within the case 752 by being disposed within the tracks 760*a*, 760*b*. The tracks may engage the foldable transaction card 758 when the foldable transaction card 758 is slid within the tracks 760*a*, 760*b*. Moreover, tabs (not shown) may be disposed within the tracks 760*a*, 760*b*, and may be similar, if not identical, to the tabs 318*a*, 318*b* as described above with reference to FIGS. 15A-15D. Moreover, the foldable transaction card may have recesses (not shown) substantially as described above with reference to the foldable transaction card 306 described above in FIG. 15D.

Figure 30A:
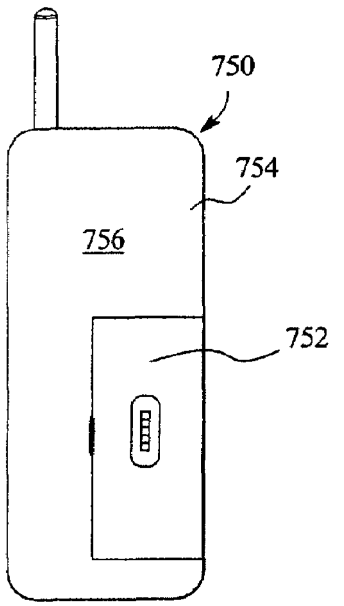
FIGS. 30A-30G illustrate an additional alternate embodiment of the present invention of a transaction card system comprising a foldable transaction card within a case or housing removably connected with a cellular telephone.
Figure 30B:
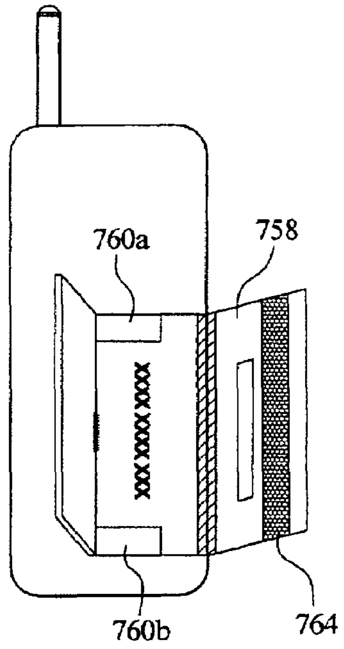
Figure 30C:
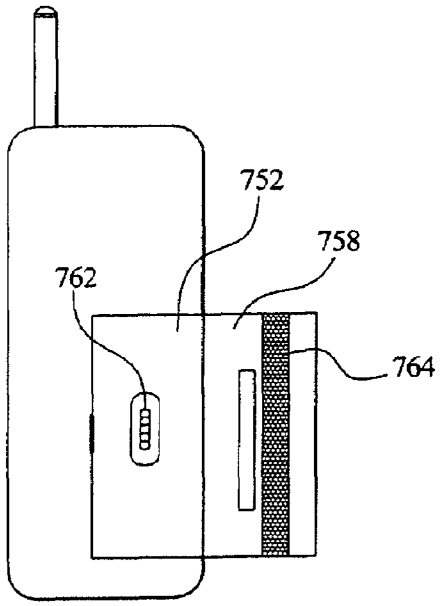
Figure 30D:
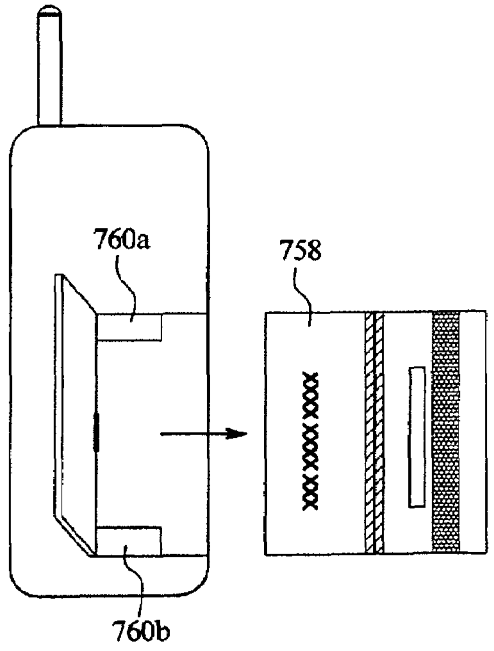

As illustrated in FIG. 30B, the transaction card housing may be opened via an actuator 762 and the foldable transaction card 758 disposed therein may be unfolded thereby exposing the magnetic stripe 764 of the foldable transaction card 758. As illustrated in FIG. 30C, the transaction card housing may be closed with the magnetic stripe 764 of the transaction card 758 still exposed. Therefore, the magnetic stripe may be slid or swiped within point-of-sale machines without removing the transaction card from the transaction card housing 752. Alternatively, the foldable transaction card 758 may be completely removable from the transaction card housing 752, as illustrated in FIG. 30D to be utilized in point-of-sale machines such as ATMs where the card must be fully slid within the point-of-sale machine, and not merely swiped.

Figure 30E:
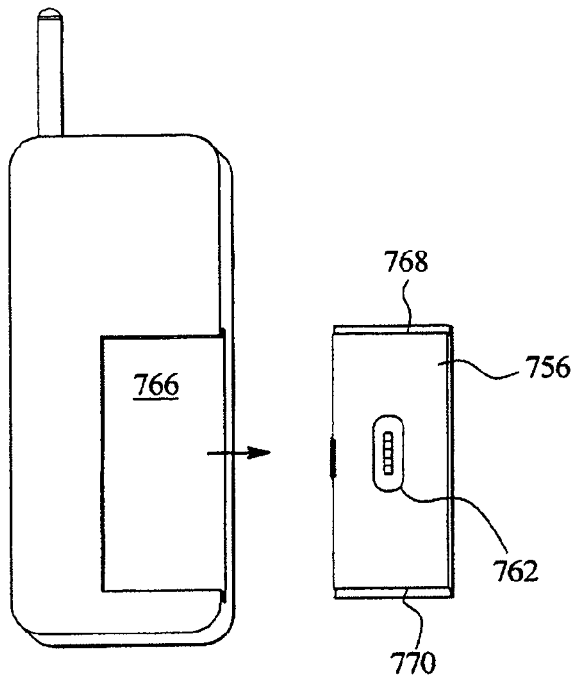
Figure 30F:
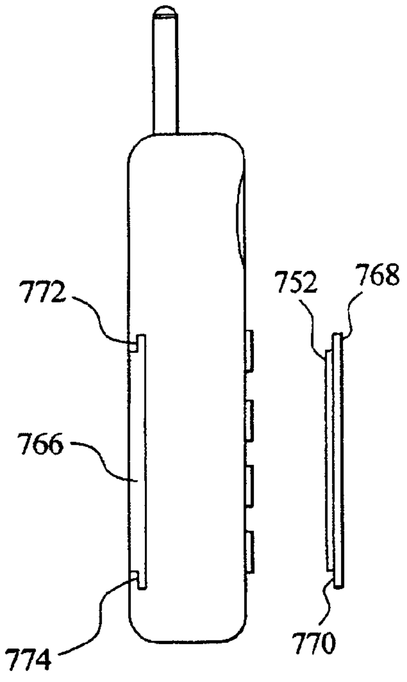
Figure 30G:
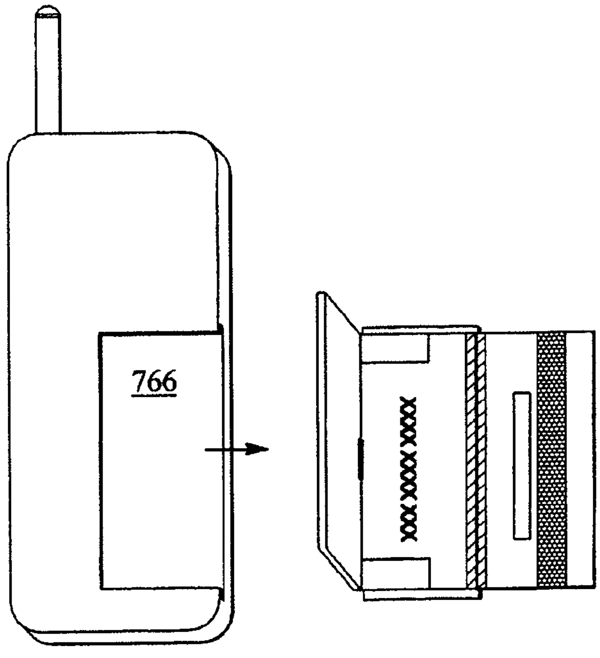

The transaction card housing 752 may be integrally and permanently connected to the mobile telephone 754. Alternatively, the transaction card housing 752 may be completely removable from the backside 756 of the mobile telephone 754, as illustrated in FIG. 30E, by removing the transaction card housing 752 from a slot 766 within the mobile telephone 754. Transaction card housing tabs 768, 770 may be provided on opposite sides of the transaction card housing 752 that may engage mobile telephone tabs 772, 774, as shown in FIG. 30F and allow the transaction card housing 752 to remain within the slot 766. Once removed from the slot 766, the transaction card housing 752 may be opened, thereby exposing the transaction card 758 contained therein.

The transaction card housing 752 may be attached or otherwise interconnected with the mobile telephone 754 in any location convenient on the mobile telephone. As noted above, any portable electronic device may have the transaction card housing 752 disposed therewith to provide a convenient and easily accessible transaction card for use, including but not limited to, mobile telephones, PDAs, or other portable electronic devices.

In a still further embodiment of the present invention, a transaction card of the present invention may be incorporated, disposed within, attached to, or otherwise interconnected with a portable electronic music device, such as an MP3 player, an iPod™ digital music player from Apple Computer, Inc., or other like portable electronic music device. The term "interconnected" as used herein includes, but is not limited to, being removably detachable from, permanently attached to, or otherwise disposed with. For example, the transaction card of the present invention is interconnected with the portable electronic music device. Therefore, the transaction card may be removably detachable from the portable electronic music device, permanently attached to the portable electronic music device, or otherwise disposed with the portable electronic music device.

Figure 31A:
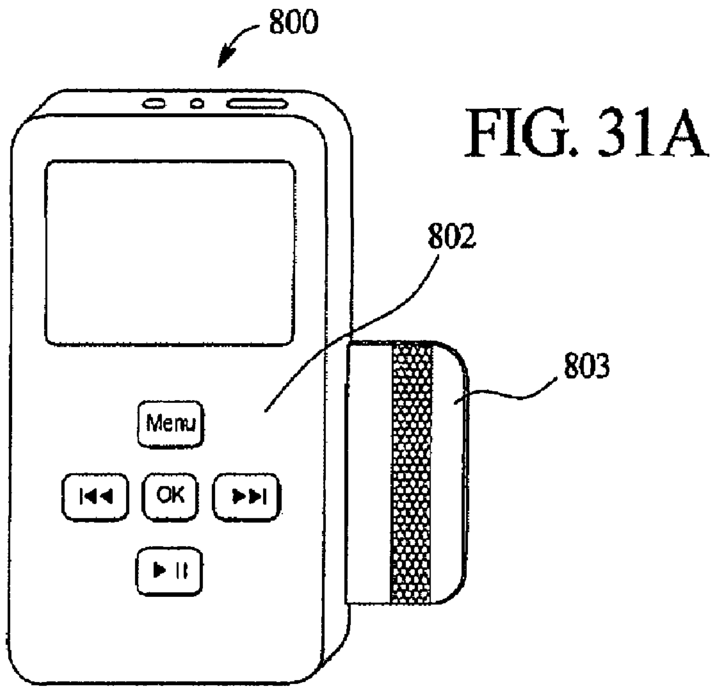
FIGS. 31A-31C illustrate a still further embodiment of the present invention of a foldable transaction card disposed within or otherwise connected to a portable electronic music device.

As shown in FIG. 31A, a front side 802 of a portable electronic music device 800 is illustrated. The portable electronic music device is an iPod™ digital music player from Apple Computer, Inc. The portable electronic music device may be an MP3 player, or may be a device capable of playing any one, many, or all of the standard digital music file types known to one having ordinary skill in the art. For example, the portable electronic music device may be an iPod™, an iPod Mini™, an iPod Nano™ or an iPod Shuffle™ digital music player, each from Apple Computer, Inc. In addition, the portable electronic music device may play music, recorded literature, programs, music videos (if incorporated with the requisite screen and drivers for displaying moving images, TV shows, movies or other like media). Of course, any other type of portable electronic music device is contemplated by the present invention, for holding and transporting the transaction card and to allow easy accessibility to the transaction card for use in purchases. A transaction card 803 may be disposed within or otherwise connected to the portable electronic music device 800.

Figure 31B:
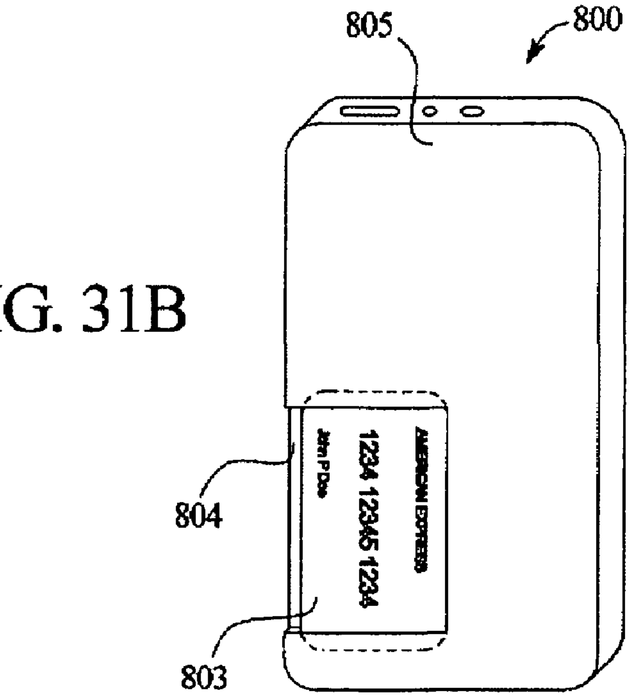

FIG. 31B illustrates a portable electronic music device 800 having a transaction card 803 disposed within a slot 804 of the backside 805 of the device 800. Although the transaction card 803 is described as being disposed within a backside 805 of the portable electronic device 800, the transaction card 803 may be disposed anywhere in the portable electronic device so as to be easily accessible and convenient to a user of the transaction card.

The transaction card 803 may be a traditionally-sized transaction card or may be any other size useful for maintaining compactness or convenience of the transaction card 803.

Figure 31C:
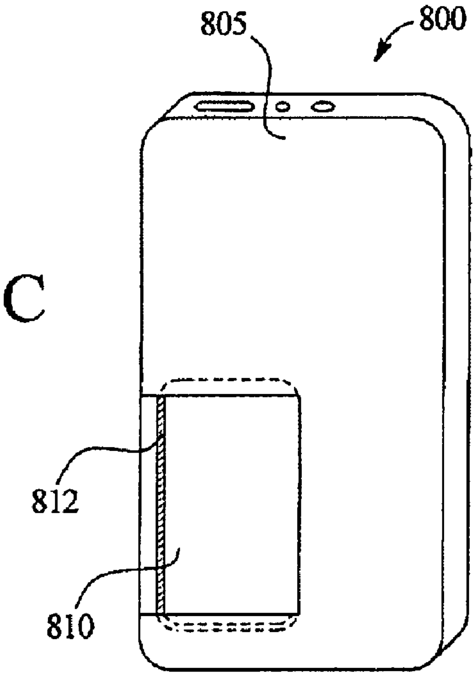

Moreover, the transaction card 803 may be a foldable transaction card, as illustrated in FIG. 31C, and disposed within slot 806 of the device 800.

Specifically, FIG. 31C illustrates the backside 805 of the device 800 having a foldable transaction card 810 disposed in a slot 812. The foldable transaction card 810 may have a hinge 814 for folding the transaction card 810. The foldable transaction card 810 may be disposed within the slot 812 in its folded state, or, alternatively, in an unfolded state, whereby a section of the foldable transaction card 810 having the magnetic stripe or memory may protrude from the device 800, thereby allowing the information contained on the foldable transaction card 810 to be easily read.

Figure 32A:
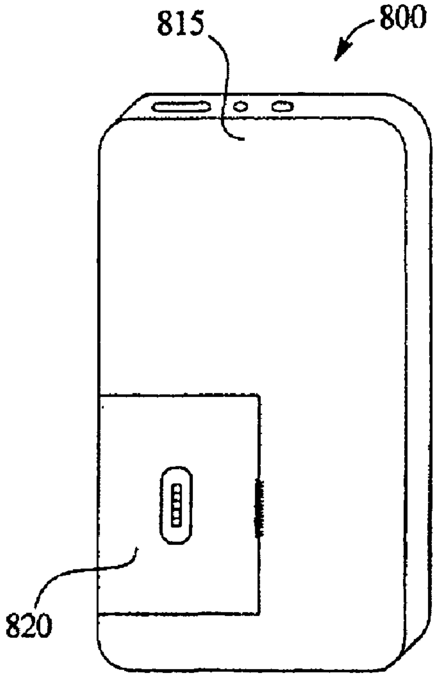
FIGS. 32A-32D illustrate a further embodiment of the present invention of a foldable transaction card system disposed within or otherwise connected to a portable electronic music device.
Figure 32B:
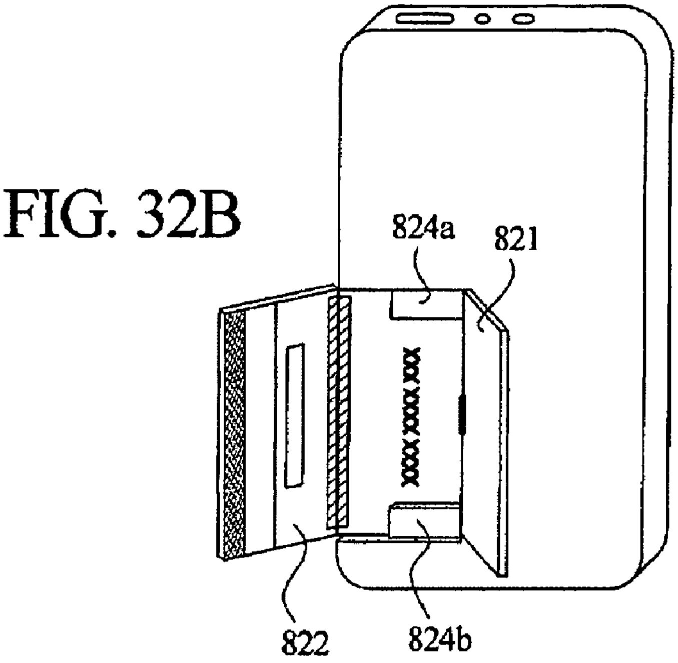
Figure 32C:
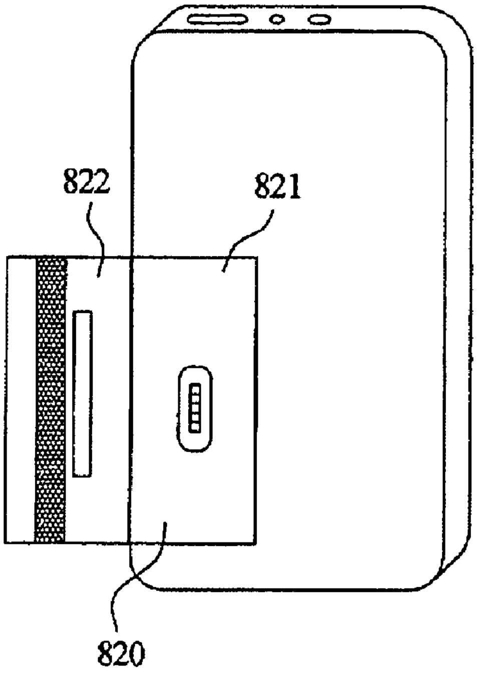
Figure 32D:
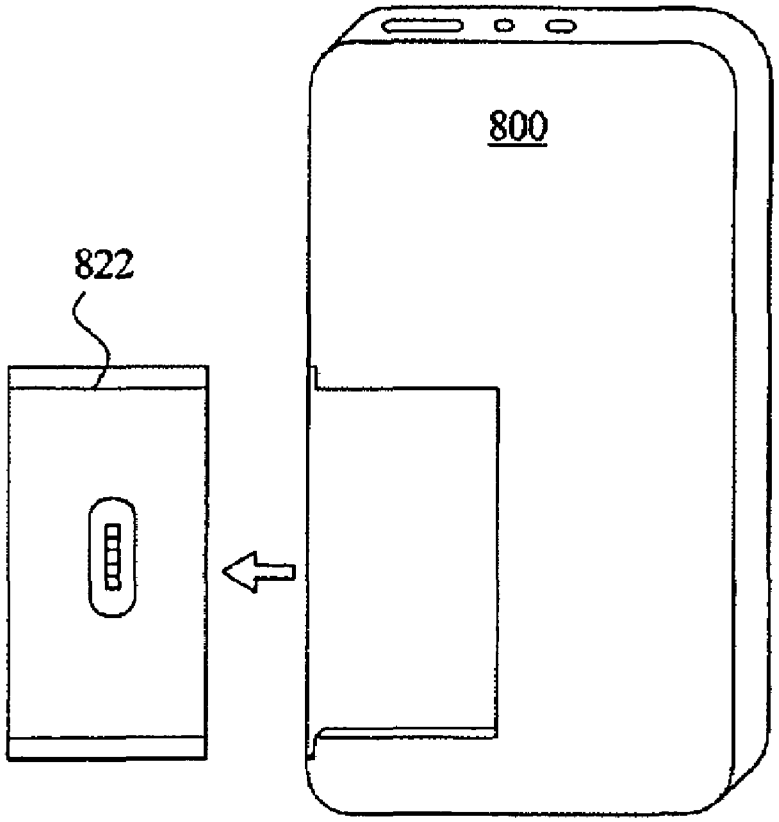

FIG. 32A illustrates a backside 815 of the portable electronic music device 800 having a foldable transaction card system 820 disposed therein. The foldable transaction card system 820 may comprise a case, holder, housing or the like (referred to herein as a "housing") and a transaction card, preferably a foldable transaction card, disposed therein. FIG. 32B illustrates the backside 815 of the device 800, wherein a housing 821 is opened, and a foldable transaction card 822 is unfolded outside the device 800. Tabs 824*a* and 824*b* hold the foldable transaction card 822 within the housing 821. FIG. 32C illustrates the foldable transaction card system 820 having the housing 821 closed, but the foldable transaction card 822 unfolded outside the device 800. FIG. 32D illustrates the foldable transaction card system 820 removed from the device 800.

The present invention has been described above with reference to exemplary embodiments. However, those skilled in the art having read this disclosure will recognize that changes and modifications may be made to the exemplary embodiments without departing from the scope of the present invention.

We claim:

1. A transaction card system comprising:

a portable electronic device;

a foldable transaction card comprising a first section and a second section;

said first section of said foldable transaction card attached to said portable electronic device, the foldable transaction card electronically unconnected with the portable electronic device;

and wherein a portion of said foldable transaction card is configured to unfold outside said portable device while said first section of said foldable transaction card is retained within said portable device, and wherein said foldable transaction card is configured to facilitate a transaction at a point of transaction.

2. The transaction card system of claim 1 wherein said portable device is a mobile telephone.

3. The transaction card system of claim 1 wherein said transaction card is removable from said portable device.

4. The transaction card system of claim 1 wherein the transaction card has at least one dimension smaller than a traditional transaction card.

5. The system of claim 1, further comprising a door having a closed state and an open state disposed on said portable device.

6. The system of claim 5, wherein said door is configured to obscure said transaction card when said door is in said closed state.

7. The system of claim 5, wherein a portion of said foldable transaction card is configured to unfold outside said portable device while a portion of said foldable transaction card is retained within said portable device when said door is in said open state.

8. The system of claim 1, wherein said transaction card contains a magnetic stripe.

9. The system of claim 1, wherein said transaction card is configured such that said magnetic stripe is configured to be swiped through a card reader.

10. The system of claim 1, wherein said portable device is a portable electronic device and wherein said transaction card is electronically unconnected with said portable electronic device.

11. The system of claim 1, wherein said foldable transaction card further comprises a first section and a second section.

12. The system of claim 11, wherein a hinge is disposed between said first section and said second section.

13. The system of claim 11, wherein a hinge is disposed between said first section and said second section, and wherein said hinge includes at least one of: a track, a polymeric material, a fabric, and a reinforcing material.

14. A transaction card system comprising:

a portable electronic device coupled with a foldable transaction card comprising a first section and a second section wherein said first section of said foldable transaction card is attached to said portable electronic device; and, said foldable transaction card having at least one fold line for folding said transaction card wherein said transaction card comprises a folded state and an unfolded state and wherein said transaction card is configured to facilitate a purchase transaction at a point of sale;

wherein, a portion of said foldable transaction card is configured to unfold outside said portable device while said first section of said foldable transaction card is retained within said portable device.

15. The system of claim 14, further comprising a door having a closed state and an open state disposed on said portable device.

16. The system of claim 15, wherein said transaction card is configured to unfold outside said portable device when said door is in said open state.

17. The system of claim 15, wherein said door is configured to obscure said transaction card when said door is in said closed state.

18. The system of claim 14, wherein said transaction card is removable from said portable device.

19. The system of claim 14, wherein said transaction card contains a magnetic stripe.

20. The system of claim 19, wherein said transaction card is configured such that said magnetic stripe is configured to be swiped through a card reader.

21. The system of claim 14, wherein said transaction card is configured to facilitate a purchase transaction at a point of sale when said transaction card is in said folded state.

22. The system of claim 14, wherein said fold line comprises at least one of: a track, a polymeric material, a fabric, and a reinforcing material.

23. A transaction card system comprising:

a portable electronic device;

a foldable transaction card interconnected with the portable electronic device, the foldable transaction card electronically unconnected with the portable electronic device;

wherein the foldable transaction card is disposed within a housing, wherein the housing is interconnected with the portable electronic device;

wherein the foldable transaction card comprises a first section and a second section;

wherein a hinge is disposed between the first section and the second section;

wherein the first section of the transaction card is attached to the housing and the second section unfolds outside the housing when the housing is opened.

* * * * *